US010902853B2

(12) United States Patent
Liu et al.

(10) Patent No.: US 10,902,853 B2
(45) Date of Patent: Jan. 26, 2021

(54) ELECTRONIC DEVICE AND VOICE COMMAND IDENTIFICATION METHOD THEREOF

(71) Applicant: Wistron Corporation, New Taipei (TW)

(72) Inventors: Yuan-Han Liu, New Taipei (TW); Yi-Wen Chen, New Taipei (TW); Yong-Jie Hong, New Taipei (TW); Ru-Feng Liu, New Taipei (TW); Rong-Huei Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 72 days.

(21) Appl. No.: 16/386,277

(22) Filed: Apr. 17, 2019

(65) Prior Publication Data

US 2020/0227039 A1    Jul. 16, 2020

(30) Foreign Application Priority Data

Jan. 11, 2019 (TW) .............................. 108101163 A

(51) Int. Cl.
*G10L 15/22* (2006.01)
*G10L 15/02* (2006.01)
(Continued)

(52) U.S. Cl.
CPC .............. *G10L 15/22* (2013.01); *G10L 15/02* (2013.01); *G10L 15/20* (2013.01); *H04R 1/406* (2013.01)

(58) Field of Classification Search
CPC ......... G10L 15/22; G10L 15/02; G10L 15/20; G10L 21/057; G10L 21/0364; G10L 21/02–0364; G10L 2021/02161–02168; G10L 2021/02082–02087; G10L 17/00; G10L 2021/02166; G10L 25/60; G10L 25/78; G10L 25/81; G10L 25/84;
(Continued)

(56) References Cited

U.S. PATENT DOCUMENTS 10,602,268 B1 *   3/2020   Soto ........................ G10L 25/84
10,657,981 B1 *   5/2020   Mansour .............. H04R 1/2873
(Continued)

FOREIGN PATENT DOCUMENTS

TW       201828282       8/2018

OTHER PUBLICATIONS

"Office Action of Taiwan Counterpart Application," dated Oct. 18, 2019, p. 1-p. 18.

*Primary Examiner* — Andrew C Flanders
(74) *Attorney, Agent, or Firm* — JCIPRNET

(57) ABSTRACT

A voice command identification method for an electronic device having a microphone matrix is provided. The method includes: obtaining a plurality of sound signals from the microphone matrix; executing a voice purify operation on the sound signals to obtain a purified sound signal and identifying a target voice signal from the purified sound signal; calculating a compound speech feature data corresponding to the target voice signal through a compound speech recognition model; comparing the compound speech feature data with a plurality of reference speech feature data in the speech feature database, so as to determine a target command mapped to the target voice signal; and executing the target command.

20 Claims, 14 Drawing Sheets

(51) Int. Cl.
*H04R 1/40* (2006.01)
*G10L 15/20* (2006.01)

(58) Field of Classification Search
CPC ... G10L 25/87; G10L 25/93; G10L 2025/783; G10L 2025/786; G10L 2025/935; H04R 1/406; G06F 40/20; G06F 40/30
See application file for complete search history.

(56) References Cited

U.S. PATENT DOCUMENTS

| | | | |
|---|---|---|---|
| 2008/0270131 A1* | 10/2008 | Fukuda | G10L 15/20 704/246 |
| 2009/0055170 A1* | 2/2009 | Nagahama | G10L 15/20 704/226 |
| 2013/0282373 A1* | 10/2013 | Visser | G10L 21/0316 704/233 |
| 2014/0067388 A1* | 3/2014 | Manikandan | G10L 15/20 704/233 |
| 2014/0278393 A1* | 9/2014 | Ivanov | G10L 21/0364 704/233 |
| 2015/0117649 A1* | 4/2015 | Nesta | H04S 7/305 381/17 |
| 2016/0240190 A1 | 8/2016 | Lee et al. | |
| 2016/0284349 A1* | 9/2016 | Ravindran | G10L 15/20 |
| 2017/0133041 A1* | 5/2017 | Mortensen | G10L 25/78 |
| 2017/0243577 A1* | 8/2017 | Wingate | G10L 15/20 |
| 2018/0174584 A1 | 6/2018 | Chih et al. | |
| 2018/0268808 A1* | 9/2018 | Song | G10L 15/20 |
| 2018/0350379 A1* | 12/2018 | Wung | G10L 21/0272 |
| 2020/0219530 A1* | 7/2020 | Nesta | H04R 3/005 |

* cited by examiner

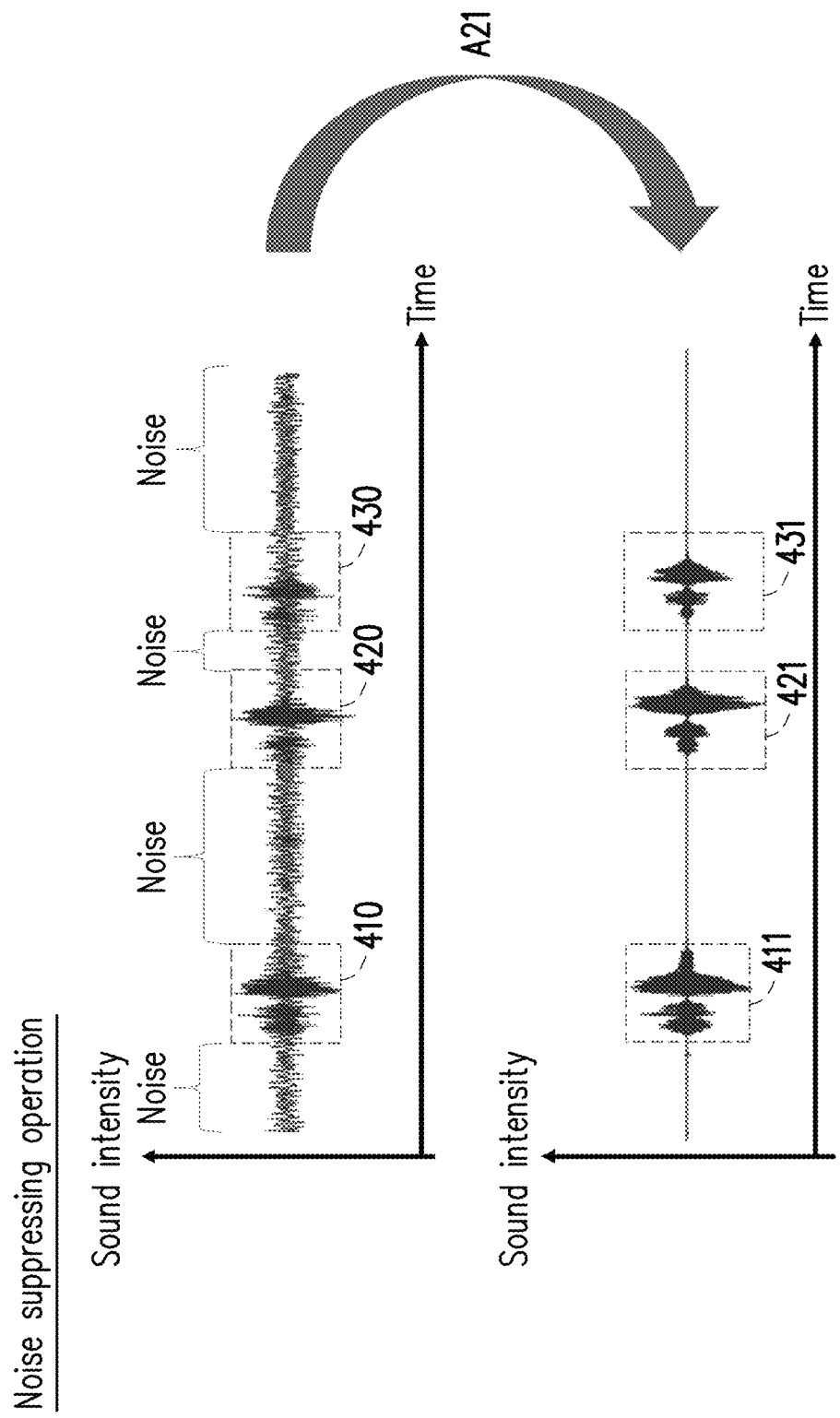

| Frame | $f_1$ | $f_2$ | $f_3$ |
|---|---|---|---|
| $F_1$ | $a_{11} =$ $\|F_1 - f_1\|$ | $a_{12} =$ $a_{11} + \|F_1 - f_2\|$ | $a_{13} =$ $a_{12} + \|F_1 - f_3\|$ |
| $F_2$ | $a_{21} =$ $a_{11} + \|F_2 - f_1\|$ | $a_{22} =$ $\min(a_{11}, a_{21}, a_{12})$ $+ \|F_2 - f_2\|$ | $a_{23} =$ $\min(a_{12}, a_{22}, a_{13})$ $+ \|F_2 - f_3\|$ |
| $F_3$ | $a_{31} =$ $a_{21} + \|F_2 - f_1\|$ | $a_{32} =$ $\min(a_{21}, a_{31}, a_{22})$ $+ \|F_3 - f_2\|$ | $a_{33} =$ $\min(a_{22}, a_{32}, a_{23})$ $+ \|F_3 - f_3\|$ |
| $F_4$ | $a_{41} =$ $a_{31} + \|F_2 - f_1\|$ | $a_{42} =$ $\min(a_{31}, a_{41}, a_{32})$ $+ \|F_3 - f_2\|$ | $a_{43} =$ $\min(a_{32}, a_{42}, a_{33})$ $+ \|F_3 - f_3\|$ |

FIG. 7A

ELECTRONIC DEVICE AND VOICE COMMAND IDENTIFICATION METHOD THEREOF

CROSS-REFERENCE TO RELATED APPLICATION

This application claims the priority benefit of Taiwan application serial no. 108101163, filed on Jan. 11, 2019. The entirety of the above-mentioned patent application is hereby incorporated by reference herein and made a part of this specification.

BACKGROUND OF THE INVENTION

1. Field of the Invention

The invention relates to a voice command identification method, and particularly relates to an electronic device and a voice command identification method thereof.

2. Description of Related Art

Through the advancement of science and technology, in order to make electronic products easier to use, more and more products are compatible with voice control. However, for the voice identification function of most products, it requires Internet connection to be able to perform the identification (e.g., Google home/voice assistant, Apple homepad/Siri, Amazon Alexa, etc.). This is because these products need to be connected to a remote server through the Internet, so that the server can perform a complicated voice identification operation on the received sounds.

SUMMARY OF THE INVENTION

The disclosure provides an electronic device and a voice command identification method thereof capable of recognizing a user's voice that is received, and independently executing a voice command identification operation on the user's voice, so as to determine a target command that the user intends to execute with the user's voice, thereby executing the target command.

An embodiment of the invention provides an electronic device, including a microphone matrix, a voice command management circuit unit, a storage unit, and a processor. The microphone matrix obtains a plurality of sound signals. The voice command management circuit unit executes a voice purify operation on the sound signals to obtain a purified sound signal and identifies a target voice signal from the purified sound signal. The voice command management circuit unit calculates a compound speech feature data corresponding to the target voice signal through a compound speech recognition model. The voice command management circuit unit compares the compound speech feature data with a plurality of reference speech feature data in a speech feature database, so as to determine a target command mapped to the target voice signal. The processor executes the target command.

An embodiment of the invention provides a voice command identification method adapted to an electronic device having a microphone matrix. The method includes: obtaining a plurality of sound signals from the microphone matrix; executing a voice purify operation on the sound signals to obtain a purified sound signal and identifying a target voice signal from the purified sound signal; calculating a compound speech feature data corresponding to the target voice signal through a compound speech recognition model; comparing the compound speech feature data with a plurality of reference speech feature data in the speech feature database, so as to determine a target command mapped to the target voice signal; and executing the target command.

Based on the above, the electronic device and the voice identification method adapted for the electronic device according to the embodiments of the invention are capable of independently determining the presence of the voice command by consuming less computing resources under the condition of not requiring Internet connection and thereby triggering the subsequent voice purify operation, making the voice command (the voice corresponding to the target command) clearer by the voice purify operation, and more accurately determining that the voice command uttered by the user is mapped to the target command of the electronic device by adopting the compound speech recognition model and a dynamic time warping method. In this way, the electronic device can be efficiently controlled with the user's voice.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4D is a schematic view illustrating a noise suppressing operation according to an embodiment of the invention.

FIG. 7A is a schematic view illustrating a matrix for calculating distances among feature data according to an embodiment of the invention.

DESCRIPTION OF THE EMBODIMENTS

Figure 1:
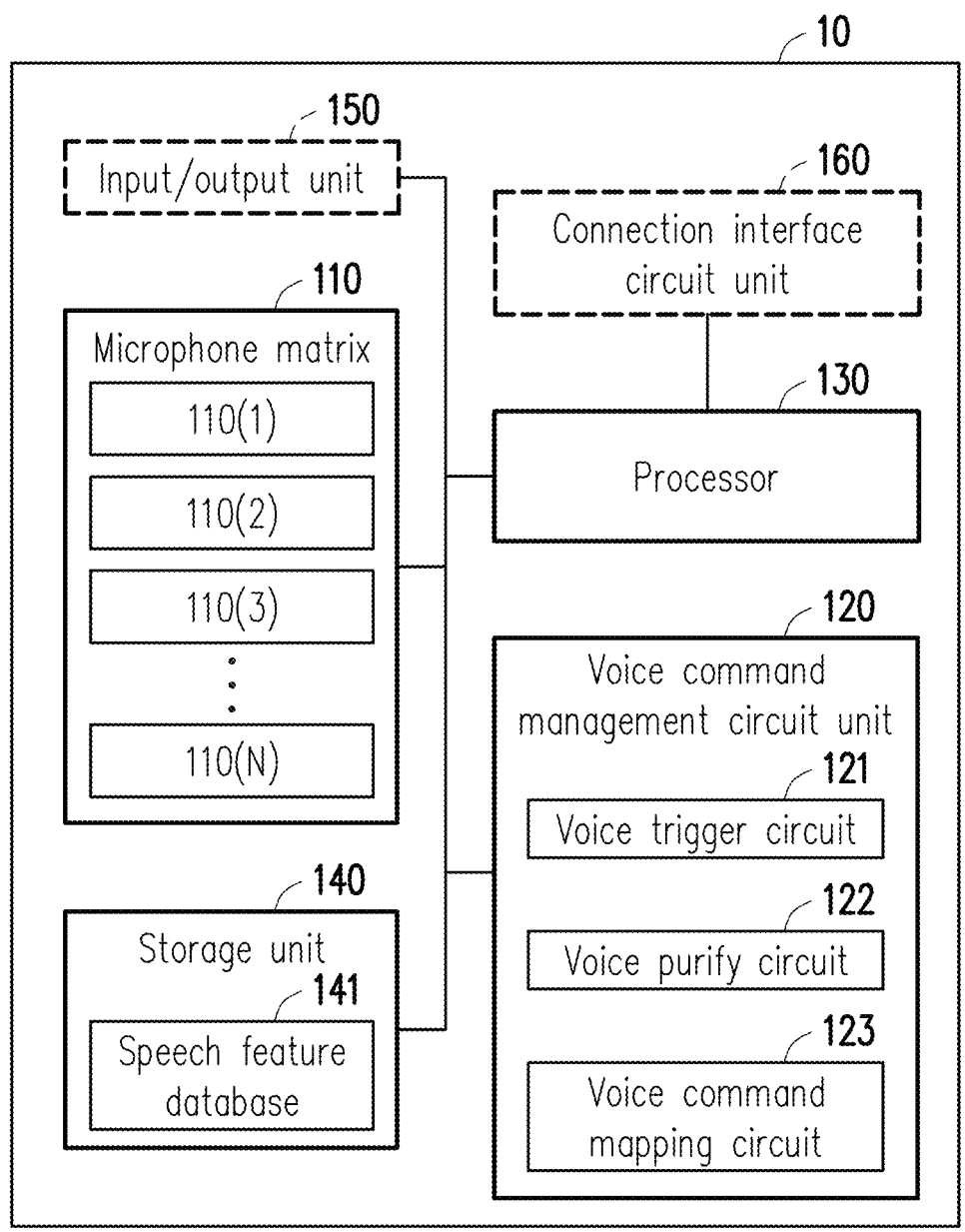
FIG. 1 is a schematic block diagram illustrating an electronic device according to an embodiment of the invention.

Reference will now be made in detail to the preferred embodiments of the invention, examples of which are illustrated in the accompanying drawings. Wherever possible, the same reference numbers are used in the drawings and the description to refer to the same or like parts.

Figure 2:
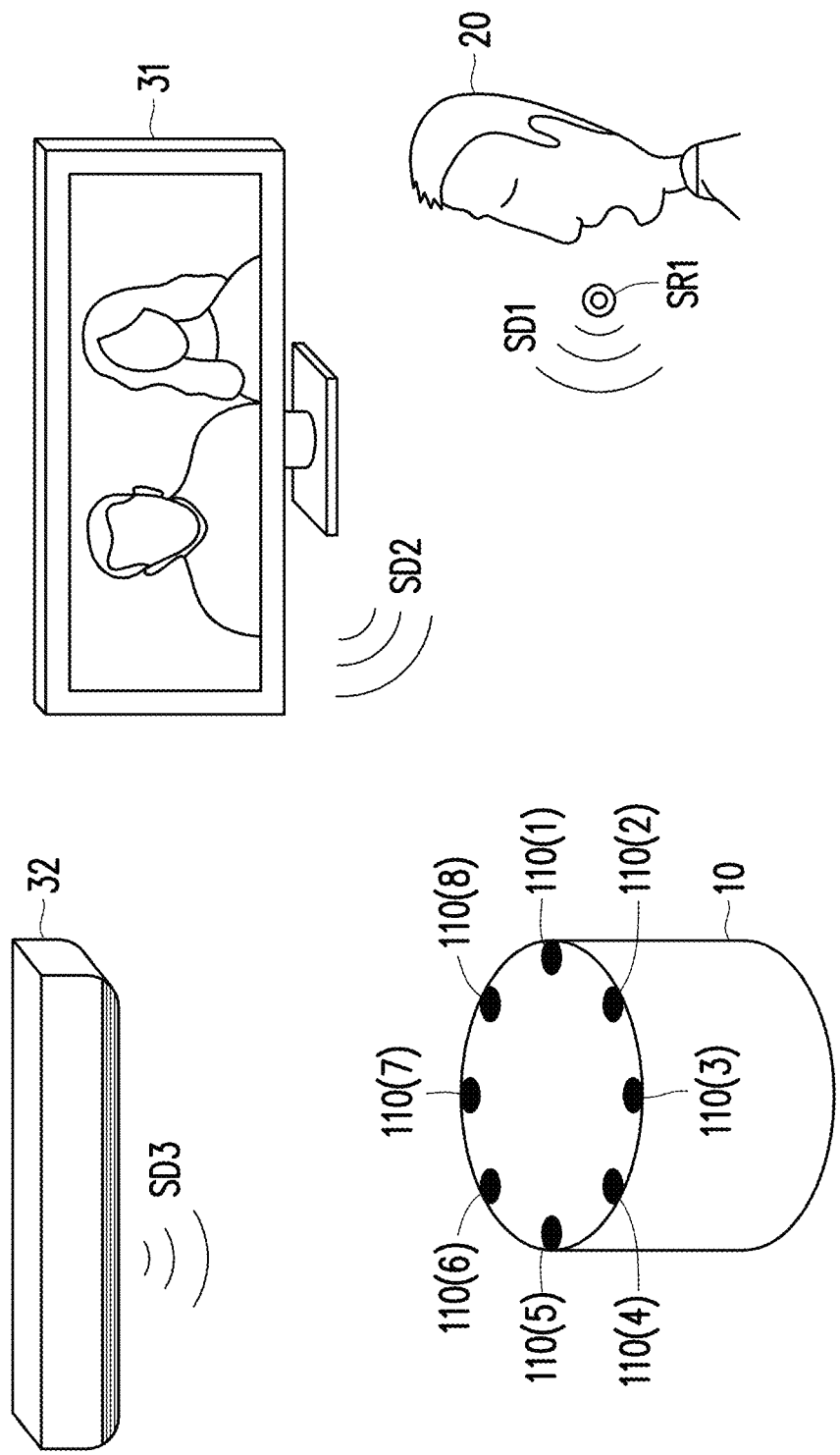
FIG. 2 is a schematic illustrating a usage scenario of an electronic device according to an embodiment of the invention.

FIG. 2 is a scenario diagram of an electronic device according to an embodiment of the invention is used. Referring to FIG. 2, an embodiment of the invention provides an electronic device 10 capable of continuously receiving surrounding sound of the electronic device 10 through a microphone matrix (including a plurality of microphones 110(1) to 110(8), for example) provided in the electronic device 10. The sounds include any ambient sound (e.g., a sound SD2 generated by a home appliance 31 or a sound SD3 generated by a home appliance 32) and a sound SD1 of a user 20 (the voice SD1 can be regarded as the sound source SR1 from the corresponding user 20). In addition, the electronic device 10 may identify whether the received sounds match any of the commands of the electronic device 10. If the received sounds match any of the commands of the electronic device 10, the electronic device 10 may correspondingly execute the matched command. In the following, various drawings are provided to elaborate on the details of the voice command identification method configured for the electronic device 10.

FIG. 1 is a schematic block diagram illustrating an electronic device according to an embodiment of the invention. Referring to FIG. 1, in the embodiment, the electronic device 10 includes a microphone matrix 110, a voice command management circuit unit 120, a processor 130, and a storage unit 140. In another embodiment, the electronic device 10 further includes an input/output unit 150 and a connection interface circuit unit 160. The processor 130 is coupled to the microphone matrix 110, the voice command management circuit unit 120, and the storage unit 140.

The microphone matrix 110 includes the microphones 110(1) to 110(N), N being the total number of the microphones. In the embodiment, N is set as 8 in default. However, the disclosure does not intend to limit the total number N of the microphones. For example, in other embodiments, N may be a positive integer greater than or equal to 8. N may be an even number, and in another embodiment, may also be 4. As shown in FIG. 2, the eight microphones 110(1) to 110(8) are evenly arranged in an annular arrangement on the electronic device 10. However, the invention is not limited thereto. For example, in other embodiments, the microphones of the microphone matrix 110 may be disposed on the surface of the electronic device and be adaptive to the shape of the electronic device, so that the microphone matrix 110 is able to receive a voice generated by a user at an arbitrary position in the vicinity of the electronic device 10. Each microphone in the microphone matrix 110 serves to receive (listen to) a sound and may convert the received sound into a sound signal. The sound signal may be transmitted to the voice command management circuit unit 120 for further processing. The invention does not intend to limit other details of the microphone.

The processor 130 is a hardware component with a computing capability (e.g., a chipset, a processor, etc.) and serves to manage the overall operation of the electronic device 10. That is, the processor 130 may control the operation for each function. In the embodiment, the processor 130 is, for example, a mono-core/multi-core central processing unit (CPU), a microprocessor, or other programmable processors, digital signal processors (DSP), programmable controllers, application specific integrated circuits (ASIC), programmable logic devices (PLD), or other similar devices.

The storage unit 140 may temporarily store data according to the instruction of the processor 130 or the voice command management circuit unit 120. The data include data for managing the electronic device 10, temporary data for executing a voice identification operation, or other types of data. However, the invention is not limited thereto. In addition, the storage unit 140 may also record some data that need to be stored in a long term according to the instruction of the processor 130 or the voice command management circuit unit 120. For example, the data may include a speech feature database 141 corresponding to the voice command identification operation or the firmware or software of the electronic device 10. It should be noted that, in another embodiment, the storage unit 140 may also be included in the processor 130. The storage unit 140 may be a hard disk drive (HDD) or a non-volatile memory storage device (e.g., a solid state drive) of any type.

As indicated above, in an embodiment, the electronic device 10 includes the input/output unit 150. The input/output unit 150 may serve to receive an output operation of the user to trigger one or more functions of the electronic device 10. In addition, the input/output unit 150 may also output information. In the embodiment, the input/output unit 150 may have a plurality of physical buttons and a display panel. In another embodiment, the input/output unit 150 may be a touch display.

Besides, in an embodiment, the processor 130 may be connected with other electronic devices through the connection interface circuit unit 160, so as to communicate with the processors of other electronic devices and obtain the information of a plurality of commands associated with other electronic devices. Therefore, by determining whether the user's voice meets the commands of other electronic devices, the processor 130 may send commands to the processors of other electronic devices, thereby controlling other electronic devices. The connection interface circuit unit 160 is compatible with the serial advanced technology attachment (SATA) standard, the parallel advanced technology attachment (PATA) standard, the Institute of Electrical and Electronic Engineers (IEEE) 1394 standard, the peripheral component interconnect express (PCI-Express) standard, the universal serial bus (USB) standard, the integrated device electronics (IDE) standard, or other suitable standards, for example.

In the embodiment, the voice command management circuit unit 120 includes a voice trigger circuit 121, a voice purify circuit 122, and a voice command mapping circuit 123. The voice command management circuit unit 120 serves to execute the voice command identification operation according to the sound received by the microphone matrix 110. The voice trigger circuit 121, the voice purify circuit 122, and the voice command mapping circuit 123 may serve to execute different stages of the voice command identification operation. The operations executed by the voice trigger circuit 121, the voice purify circuit 122, and the voice command mapping circuit 123 may also be represented as the overall operation of the voice command management circuit unit 120.

The voice trigger circuit 121 serves to choose one sensing microphone of the microphone matrix 110, execute a voice trigger sensing operation (a voice trigger sensing stage in the voice command identification operation) according to the sound signal generated by the sensing microphone, and determine whether to trigger a subsequent process (e.g., a voice purify stage, a voice command identify stage, and a voice command execute stage in the voice command identification operation) according to the result of the voice trigger sensing operation. In this way, the case where multiple voice trigger sensing operations are simultaneously being executed for multiple voice signals of multiple microphones is avoided, and the computational resources consumed by the voice command management circuit unit 120 can be reduced. According to the sound signals generated by the microphones, the voice trigger circuit 121 may choose the microphone of the sound signal with the greatest sound intensity among the sound signals as the sensing microphone. In addition, the sensing microphone may also be a microphone preset by the user or the manufacturer.

The voice purify circuit 122 serves to execute the voice purify operation at the voice purify stage in the voice command identification operation. In the voice purify operation, the voice purify circuit 122 may identify the orientation of a sound source SR1 corresponding to a user's voice with respect to the electronic device 10, thereby enhancing the sound intensity of the user's voice while reducing the sound intensity of sounds in other orientations. Besides, in the voice purify operation, the voice purify circuit 122 may further suppress noise in the sound signals according to noise information that is updated constantly. In this way, the voice purify circuit 122 may capture a target voice signal corresponding to the user's voice from the sound signals.

The voice command mapping circuit 123 serves to execute a voice command mapping operation at a voice command mapping stage in the voice command identification operation. In the voice command mapping operation, the voice command mapping circuit 123 may obtain a corresponding compound speech feature data according to the target voice signal, and compare the compound speech feature data with a plurality of reference speech feature data in the speech feature database 141 to find out a target command mapped to the target voice signal. The voice command mapping circuit 123 may transmit the target command to the processor 130 to instruct the processor 130 to execute a function corresponding to the target command. It should be noted that, in an embodiment, the voice command mapping circuit 123 may further include a storage circuit, so that the speech feature database 141 may be stored in the storage circuit of the voice command mapping circuit 123.

In the following, details of the voice command identification method and the operations of the respective parts of the electronic device 10 according to an embodiment of the invention will be described with reference to FIGS. 3A to 3C.

Figure 3A:
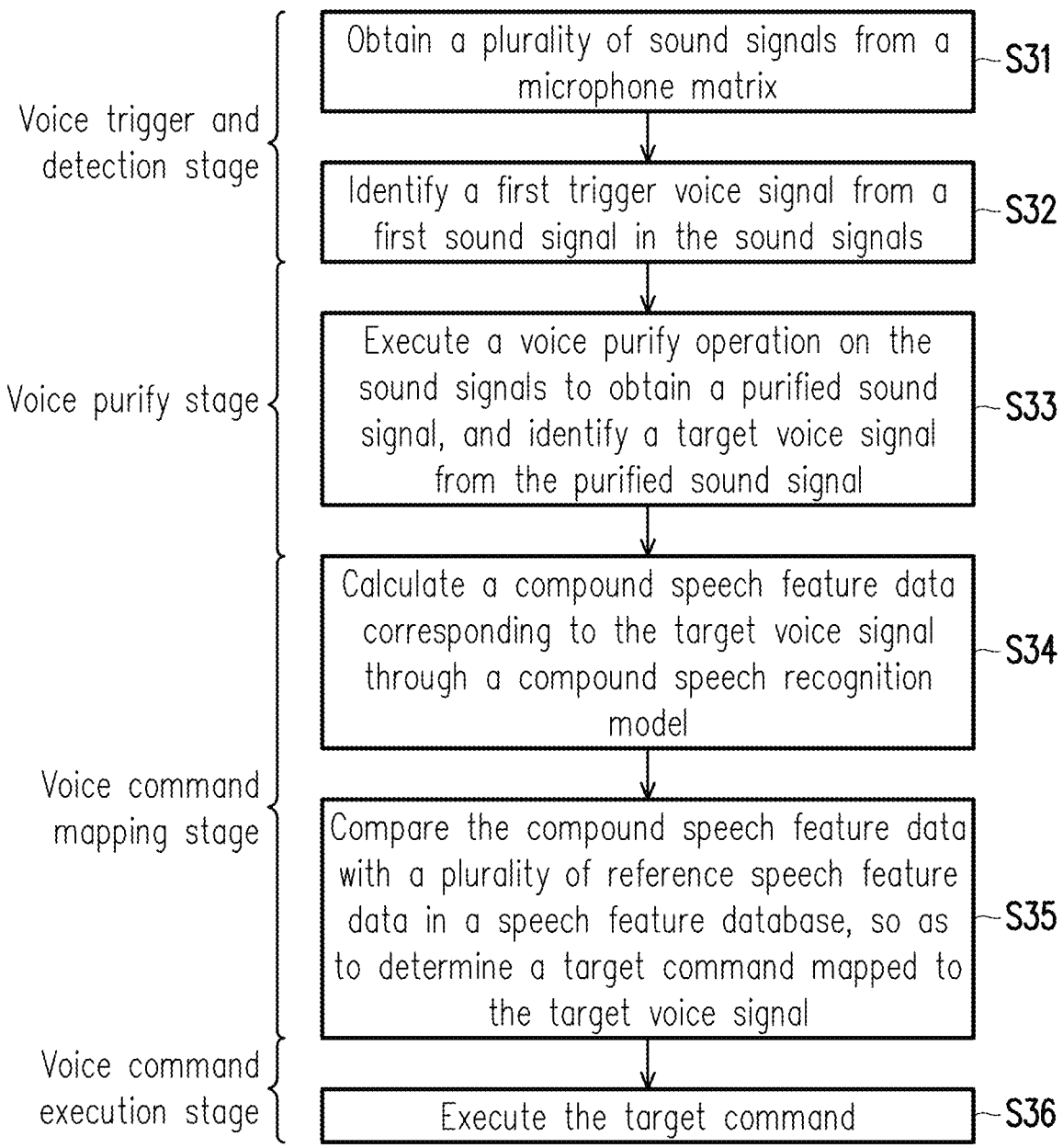
FIG. 3A is a flowchart illustrating a voice command identification method according to an embodiment of the invention.

FIG. 3A is a flowchart illustrating a voice command identification method according to an embodiment of the invention. Referring to FIGS. 1, 2, and 3A, at Step S31, the sound signals are obtained through the microphone matrix 110 (N is preset to 8). Specifically, through the microphones 110(1) to 110(8) of the microphone matrix 110, the sound signals respectively corresponding to the microphones 110(1) to 110(8) of the microphone matrix are obtained. The sound signals are transmitted to the voice command management circuit unit 120. In the embodiment, it is assumed that the microphone 110(1) is configured as the sensing microphone (also referred to as first microphone). The voice command management circuit unit 120 may keep analyzing the sound signal (also referred to as first sound signal) generated by the microphone 110(1) (i.e., executing the voice trigger sensing operation on the first sound signal).

Then, according to the analysis result, in step S32, the voice command management circuit unit 120 serves to identify a first trigger voice signal from the first sound signal in the sound signals. Steps S31 and S32 may represent the voice trigger sensing stage in the voice command identification operation. In the following, details of the voice trigger sensing stage will be described with reference to FIG. 3B.

Figure 3B:
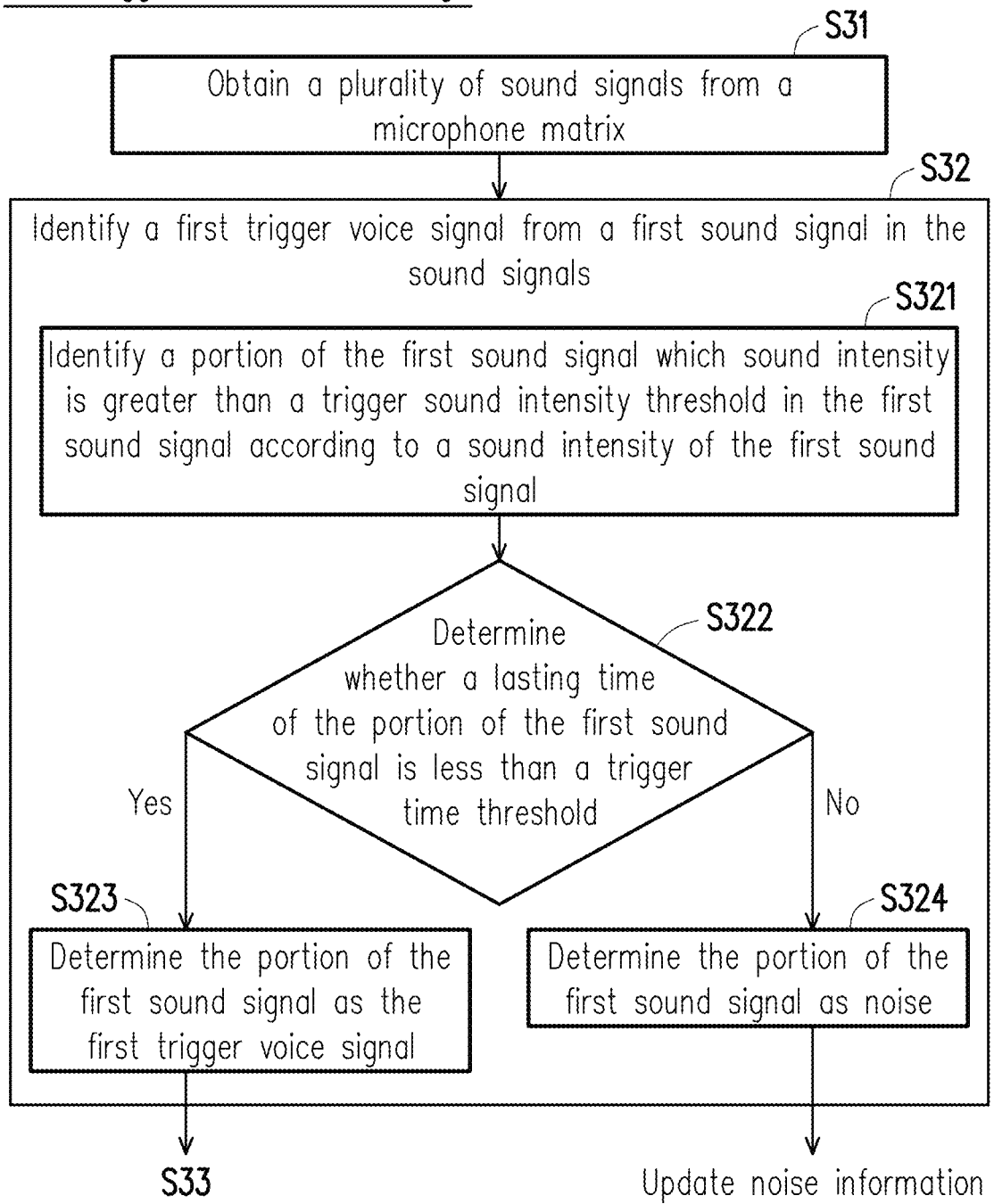
FIG. 3B is a flowchart illustrating a voice trigger detection stage of a voice command identification method according to an embodiment of the invention.

FIG. 3B is a flowchart illustrating a voice trigger sensing stage of a voice command identification method according to an embodiment of the invention. Referring to FIG. 3B, step S32 includes steps S321 to S324.

In step S321, according to the sound intensity of the first sound signal, a portion of the first sound signal whose sound intensity is greater than a trigger sound intensity threshold in the first sound signal is identified. In an embodiment, the voice trigger circuit 121 only keeps a sound signal within a human voice frequency band (e.g., 300 Hertz to 3400 Hertz), so that the first sound signal is a sound signal corresponding to the human voice frequency band. In this way, the computational load can be reduced, and the influences of other types of noise can be avoided by focusing on the human voice frequency band only. In addition, clear/dull sounds uttered at a faster rate or lacking intensity may also be sensed.

Specifically, the voice trigger circuit 121 may analyze the waveform and the sound intensity of the first sound signal. When the sound intensity of the first sound signal is greater than the trigger sound intensity threshold, the voice trigger circuit 121 may further set an initial time, so as to accumulate the lasting time during which the sound intensity of the first sound signal is greater than the trigger sound intensity threshold from the initial time. That is, the portion of the first sound signal is a portion of the sound signal in which the sound intensity is constantly greater than the trigger sound intensity threshold in the first sound signal.

Then, in step S322, the voice trigger circuit 121 determines whether the lasting time of the portion of the first sound signal is less than a trigger time threshold. Specifically, in this embodiment, it is assumed that the length of the voice in correspondence with the command of the electronic device generated by the user is less than the trigger time threshold (e.g., 3 seconds). Hence, in response to the length of the lasting time of the portion of the first sound signal being less than the trigger time threshold, the voice trigger circuit 121 determines that the portion of the first sound signal is a first trigger voice signal (step S232), and in response to the length of the lasting time of the portion of the first sound signal being not less than the trigger sound threshold, the voice trigger circuit 121 determines that the portion of the first sound signal is noise (step S324). In this way, the voice trigger circuit 121 may further prevent the constant noise (e.g., sounds resulting from operations of home appliances, sounds of home appliances, etc.) around the electronic device 10 from being recognized as the trigger voice signal.

Besides, in another embodiment, the voice trigger circuit 121 assumes that the length of the voice in correspondence with the command of the electronic device generated by the user is greater than a critical time threshold (e.g., 0.5 seconds or 1 second) and less than the trigger time threshold (e.g., 3 seconds). Accordingly, the voice trigger circuit 121 may determine whether the lasting time of the portion of the first sound signal is greater than the critical time threshold and less than the trigger time threshold, so as to determine whether the portion of the first sound signal is the first trigger voice signal or noise. In this way, the voice trigger circuit 121 may further prevent a short but loud noise around the electronic device 10 from being recognized as the trigger voice signal.

If the portion of the first sound signal is determined as noise, the voice purify circuit 122 may update the recorded noise information according to the portion of the first sound signal determined as noise. The noise information is applied in a noise suppressing operation in the voice purify operation. For example, the voice purify circuit 122 may filter out the noise in the sound signals according to the portion of the first sound signal determined as noise. In other words, in the voice trigger sensing stage, the determined noise in the first sound signal may be further fed back to the subsequent voice purify operation, so as to facilitate the noise suppression efficiency of the voice purify circuit 122.

Following the above, after determining that the portion of the first sound signal is the first trigger voice signal (Step S323), the voice trigger circuit 121 may instruct the voice purify circuit 122 to execute the subsequent voice purify stage (i.e., step S33). In other words, the flow proceeds to step S33.

At step S33, the voice purify circuit 122 executes the voice purify operation on the sound signals to obtain a purified sound signal and identify the target voice signal from the purified sound signal.

Figure 3C:
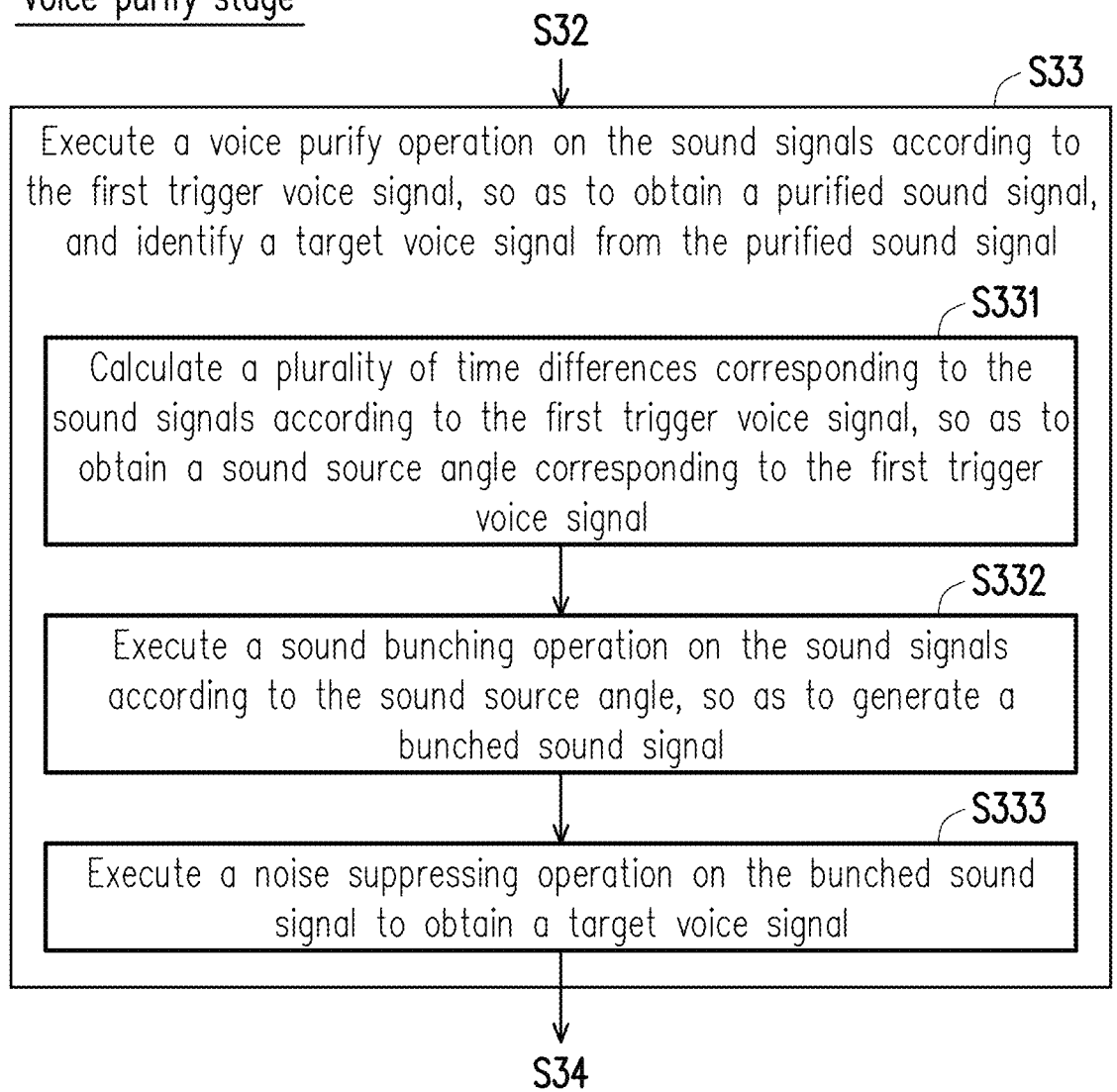
FIG. 3C is a flowchart illustrating a voice purify stage of a voice command identification method according to an embodiment of the invention.

FIG. 3C is a flowchart illustrating a voice purify stage of a voice command identification method according to an embodiment of the invention. Referring to FIG. 3C, step S33 may include steps S331 to S333.

At Step S331, the voice purify circuit 122 may execute a sound source orientation operation on the sound signals according to the first trigger voice signal, so as to obtain a sound source angle corresponding to the first trigger voice signal. In the following, the sound source orientation operation will be described in detail with reference to FIGS. 4A to 4C.

Figure 4A:
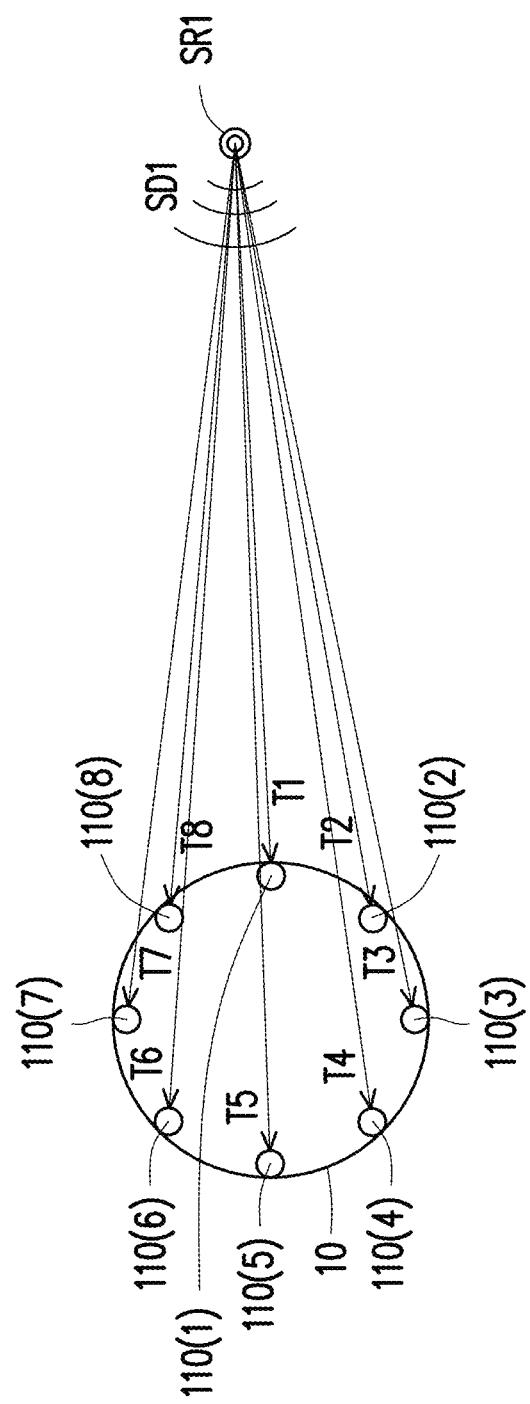
FIGS. 4A to 4C are schematic views illustrating a sound source orientation operation according to an embodiment of the invention.
Figure 4B:
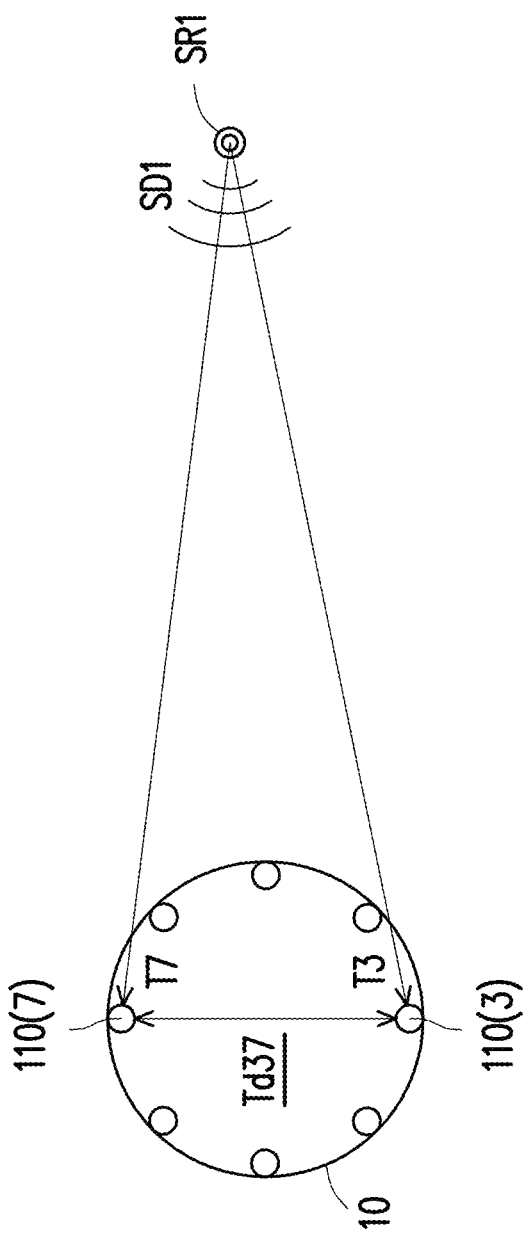
Figure 4C:
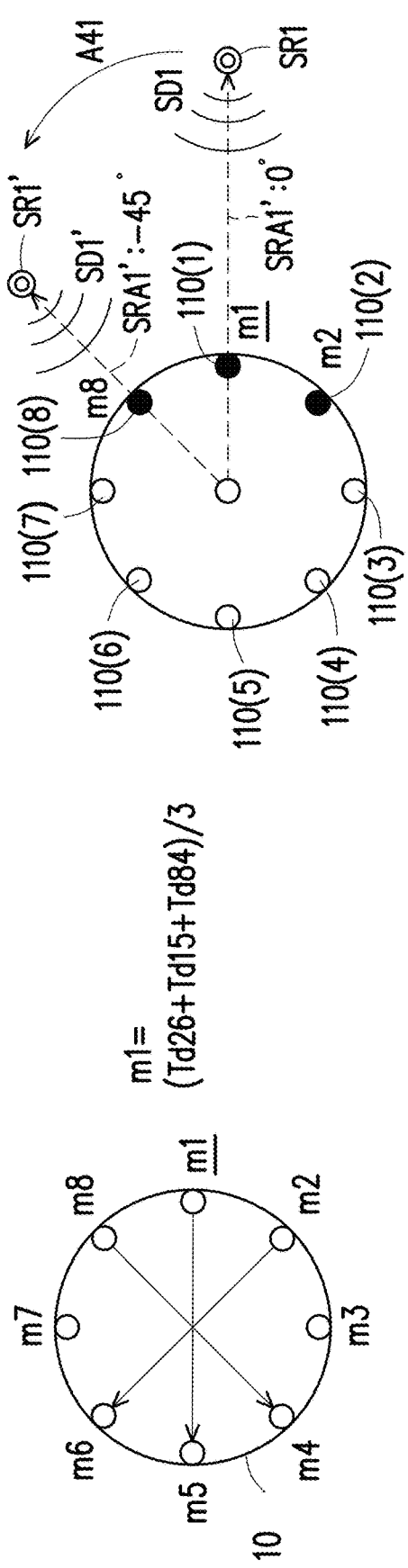

FIGS. 4A to 4C are schematic views illustrating a sound source orientation operation according to an embodiment of the invention. Referring to FIG. 4A, as an example, it is assumed that the sound source SR1 generates the sound SD1, and the microphones 110(1) to 110(8) of the microphone matrix 110 all receive the sound SD1. After determining the first trigger voice signal, the voice purify circuit 122 may respectively identify second trigger voice signals from a plurality of second sound signals generated by the microphones 110(2) to 110(8) (also referred to as second microphone) other than the first microphone 110(1). In other words, after determining the presence of the first trigger voice signal in the first sound signal, the voice purify circuit 122 may identify the second trigger voice signal corresponding to the first trigger voice signal from each second sound signal. The waveform and the sound intensity of the second trigger voice signal may be similar or identical to the waveform and the sound intensity of the first trigger voice signal. In another embodiment, each of the microphones may respectively divide up the sound signal to form a sound signal with properties of being greater than the trigger sound intensity threshold, greater than the critical time threshold, less than the trigger time threshold, and is at a human voice frequency, so as to generate a corresponding sound signal to the voice command management circuit unit 120.

Then, the voice purify circuit 122 identifies a plurality of initial times corresponding to the first trigger voice signal and the second trigger voice signals (which may also be construed as the initial times of the second sound signals), and may calculate a plurality of time differences among the microphones 110(1) to 110(8) according to the initial times. The microphones 110(1) to 110(8) respectively correspond to different angles (also referred to as microphone angles), each of the time differences corresponds to a different microphone angle, and different microphone angles respectively correspond to different microphones in the microphones 110(1) to 110(8). More specifically, there are many combinations and corresponding time differences among the eight microphones. In order to make the time delays more salient to render the maximum angular resolution, the time differences are calculated by using the diagonal relationship in the embodiment. That is, in order to maximize the distance between two microphones corresponding to a time difference, in the embodiment, the eight microphones are defined into four sets of diagonal microphone (e.g., the microphone 110(1) and the microphone 110(5) form a set of diagonal microphones, the microphone 110(2) and the microphone 110(6) form a set of diagonal microphones, the microphone 110(3) and the microphone 110(7) form a set of diagonal microphones, the microphone 110(4) and the microphone 110(8) form a set of diagonal microphones). The angular difference between each pair of the diagonal microphones and a center C10 of the electronic device 10 is 180 degrees (diagonal). In addition, in the embodiment, the symmetry between the diagonal microphones are further used to calculate the time difference and the corresponding sound source angle. Time differences Td15 and Td51 obtained from the diagonal microphones 110(1) to 110(5) may be set in advance to correspond to the angles of 0 and 180 degrees. In this way, the angular degrees corresponding to the time differences of other diagonal microphones may also be derived (e.g., a time difference Td37 corresponding to the diagonal microphones 110(3) and 110(7) corresponds to the angle of 90 degrees). The angle corresponding to a time difference may also be referred to as the corresponding angle of the time difference.

For example, as shown in FIG. 4A, the initial time of the first trigger sound signal in the first sound signal generated by the first microphone 100(1) is a time T1, and the initial times of the second trigger sound signals in the second sound signals generated by the second microphones 110(2) to 110(8) are times T2 to T8. In this embodiment, the voice purify circuit 122 calculates the time difference between the initial times of each pair of diagonal microphones.

For example, as shown in FIG. 4B, the second microphones 110(3) and 110(7) are paired, and the voice purify circuit 122 may calculate a time difference Td37 between the initial times of the second microphones 110(3) and 110(7) by obtaining a difference resulting from subtracting the initial time T7 of the second microphone 110(7) from the initial time T3 of the second microphone 110(3) (i.e., Td37=T3−T7). In this embodiment, the eight microphones 110(1) to 110(8) form eight sets of diagonal microphones. With the above process, as shown in the table in FIG. 4B, the voice purify circuit 122 may calculate eight time differences of the four sets of diagonal microphones, which include the time differences Td15 and Td51 corresponding to the diagonal microphones 110(1) and 110(5), the time differences Td26 and Td62 corresponding to the diagonal microphones 110(2) and 110(6), the time differences Td37 and Td73 corresponding to the diagonal microphones 110(3) and 110(7), and the time differences Td48 and Td84 corresponding to the diagonal microphones 110(4) and 110(8).

Then, the voice purify circuit 122 calculates a plurality of time difference moving averages corresponding to the time differences of the sets of diagonal microphones.

Specifically, in the embodiment, the time difference Td15 corresponds to the microphone 110(1) and the corresponding angle thereof is 0 degrees; the time difference Td51 corresponds to the microphone 110(5) and the corresponding angle thereof is 180 degrees; the time difference Td26 corresponds to the microphone 110(2) and the corresponding angle thereof is 45 degrees; the time difference Td62 corresponds to the microphone 110(6) and the corresponding angle thereof is −135 degrees; the time difference Td37 corresponds to the microphone 110(3) and the corresponding angle thereof is 90 degrees; the time difference Td73 corresponds to the microphone 110(7) and the corresponding angle thereof is −90 degrees; the time difference Td48 corresponds to the microphone 110(4) and the corresponding angle thereof is 135 degrees; the time difference Td84 corresponds to the microphone 110(8) and the corresponding angle thereof is −45 degrees.

In addition, considering elimination of signal measurement errors, the voice purify circuit 122 may further calculate the moving averages for the time differences, wherein the parameter adopted for the moving averages is set as 3. In this embodiment, the voice purify circuit 122 adopts the microphone corresponding to one of the time differences as center, and finds two microphones beside the microphone adopted as the center and two corresponding time differences according to the parameter "3" adopted by the moving averages. Then, a total of three time differences are adopted to calculate the time difference moving average.

For example, a time difference moving average m1 corresponding to the time difference td15 (also corresponding to the microphone 110(1)) is calculated by using the time difference Td15 and the time differences Td26 and Td84 before and after the time difference Td15. That is, the time difference moving average m1 corresponding to the time difference Td15 is −13/3 (i.e., (Td26+Td15+Td84)/3), and the corresponding angle of the time difference moving average m1 is the same as the corresponding angle of the time difference Td15 (i.e., 0 degrees). By analogy, as shown in the table of FIG. 4C, the voice purify circuit 122 may calculate the remaining time difference moving averages m2 to m8 and the respective corresponding angles.

Then, the voice purify circuit 122 chooses a plurality of target time difference moving averages according to the magnitudes of the time difference moving averages m1 to m8. In addition, the number of the target time difference moving averages is less than the number of the time difference moving averages. Specifically, the closer a microphone is to the sound source SR1 of the first trigger voice signal, the smaller the value of the corresponding time difference moving average. That is, in this case, the microphone 110(1) corresponding to the time difference moving average m1 is the microphone closest to the sound source SR1 among all the microphones 110(1) to 110(8). In an embodiment, the voice purify circuit 122 may choose all the time difference moving averages that are negative as the target time difference moving averages.

Then, the voice purify circuit 122 may calculate the sound source angle according to the target time difference moving averages and the corresponding angles respectively corresponding to the target time difference moving averages. Specifically, the voice purify circuit 122 may calculate the total of the target time difference moving averages in advance, and divide each of the target time difference moving averages by the total of the target time difference moving averages, so as to obtain a plurality of time difference ratios. For instance, following the above example, the negative time difference moving averages m1, m8, and m2 are set as the target time difference moving averages. The total of the target time difference moving averages m1, m8, and m2 is −31/3, and the corresponding time difference ratios are respectively 13/31, 9/31, and 9/31 (as shown in the table of FIG. 4C).

Then, the voice purify circuit 122 multiplies the corresponding angles 0 degrees, 45 degrees, and −45 degrees corresponding to the target time difference moving averages m1, m8, and m2 by the time difference ratios corresponding to the target time difference moving averages m1, m8, and m2, so as to obtain weighted angles 0 degrees, (405/31) degrees, and (−405/31) degrees corresponding to the target time difference moving averages m1, m8, and m2. Afterwards, the voice purify circuit 122 adds up all the weighted angles corresponding to the target time difference moving averages m1, m8, and m2 to obtain a total of the weighted angles, and adopt the total of the weighted angles as the sound source angle corresponding to the sound source SR1.

As shown in FIG. 4C, the sound source angle after calculation is 0 degrees. In other words, the angle of the sound source SR1 with respect to the center C10 of the electronic device is 0 degrees, and the corresponding angle of the sound source SR1 with respect to the microphone 110(1) is 0 degrees. For example, it is assumed that, as the user moves, the trigger voice is a voice SD1', and the sound source angle derived through calculation is changed from 0 degrees to −45 degrees (as indicated by an arrow A41, for example). In this case, the angle of a sound source SR1' after movement with respect to the center C10 is −45 degrees.

Then, after obtaining the sound source angle, in step S332, the voice purify circuit 122 executes a sound bunching operation on the sound signals according to the sound source angle, so as to generate a bunched sound signal. Specifically, the voice purify circuit 122 may adopt the beamforming technology to read the first trigger voice signal and the second trigger voice signals, and calculate a steer vector corresponding to each of the sound signals according to the sound source angle, so as to separate the sound signal corresponding to the sound source angle. For example, regarding a sound signal, the sound intensity of a portion of the sound signal within an angular range of the sound source angle is enhanced, and the sound intensity of remaining portions of the sound signal is reduced (or directly filtered out). In this way, the bunched sound signal may be formed by collecting the sound signals whose sound intensities are adjusted. Such an operation is referred to as a sound bunching operation.

In an embodiment, according to the sound source angle, the voice purify circuit 122 identifies a bunched portion and a non-bunched portion corresponding to the sound source angle in each of the sound signals. The voice purify circuit 122 may enhance the sound intensity of the bunched portion in each of the sound signals, reduces the sound intensity of the non-bunched portion of each of the sound signals, and add up the bunched portions in the sound signals according to the sound angle and the time differences corresponding to the microphones, so as to obtain the bunched sound signal. In another embodiment, the voice purify circuit 122 may execute the sound bunching operation according to the following: (1) converting temporal-domain signals of the sound signals into the frequency domain through a Fourier transform; (2) calculating the steer vector of each of the sound signals by using the sound source angle; (3) establishing a beamformer by using the obtained steer vectors; (4) inputting the frequency-domain sound signals to the beamformer for superposition, so as to obtain a single sound signal; and (5) performing a reverse Fourier transform on the obtained single sound signal, so as to obtain a time-domain bunched sound signal.

Then, in step S333, the voice purify circuit 122 executes a noise suppressing operation on the bunched sound signal, so as to obtain the target voice signal.

FIG. 4D is a schematic view illustrating a noise suppressing operation according to an embodiment of the invention.

Referring to FIG. 4D, the upper part of FIG. 4D is a signal waveform of a bunched sound signal. The bunched sound signal has a plurality of noise sections and non-noise sections 410, 420, and 430. The non-noise sections 410, 420, and 430 are sound signals corresponding to the sound source angle.

Specifically, according to the noise information and the human voice frequency band, the voice purify circuit 122 may reduce the sound intensity of the noise in the bunched sound signal through a Wiener filter by adopting the two-step noise reduction (TSNR) method and the harmonic regeneration noise reduction method, so as to obtain a purified sound signal. The TSNR method prevents a frame delay from occurring due to computation, and the harmonic regeneration noise reduction method prevents the sound signal from being distorted due to excessive noise suppression. In the embodiment, the Wiener filter may serve to suppress background noise in a steady state. In addition, in this embodiment, the voice purify circuit 122 may further use the noise information to supplement the insufficiency of the Wiener filter. The noise information is adaptive background noise information, namely the information corresponding to transient noise identified in the voice identification operation. The voice purify circuit 122 may suppress transient noise in sound information through the TSNR method and the harmonic regeneration noise suppression method by correspondingly using the noise information of the transient noise in the current environment. If no voice activity is detected, the ambient noise that is identified may be constantly updated correspondingly, so that the adaptive noise information can be constantly updated in correspondence with changes of the ambient noise. It should be noted that, in the noise suppressing operation, the voice purify circuit 122 may refer to the human voice frequency band (300 Hz to 3400 Hz), keep only sound signals within such range of the frequency band in the bunched sound signal, and remove sound signals exceeding such range of the frequency band.

In other words, referring to FIG. 4D, as indicated by an arrow A21, the target voice signal can be obtained from the bunched sound signal (also referred to as purified sound signal) shown in the upper part of FIG. 4D by executing the noise suppressing operation. Specifically, the waveforms of the sound signals in the non-noise sections 410, 420, and 430 become clearer sound signals after the noise suppressing operation (e.g., non-noise sections 411, 421, and 431), and noise signals (noise signals resulting from noise) therein are also eliminated. In an embodiment, the voice purify circuit 122 adopts a target sound intensity threshold to identify the target voice signal from the purified sound signal. The voice purify circuit 122 may identify the target voice signal from the non-noise sections 411, 421, and 431. The sound intensity of the target voice signal is greater than the target sound intensity threshold. For example, the sound intensities of the sound signals in the non-noise sections 411, 421, and 431 are all greater than the target sound intensity threshold, and the sound signals in the non-noise sections 411, 421, and 431 are all qualified target voice signals. The identified target voice signal is captured by the voice purify circuit 122 and used in the subsequent voice command mapping stage (i.e., Steps S34 to S35). In the following, details of the voice command mapping stage will be described with reference to FIGS. 5A and 5B.

Figure 5A:
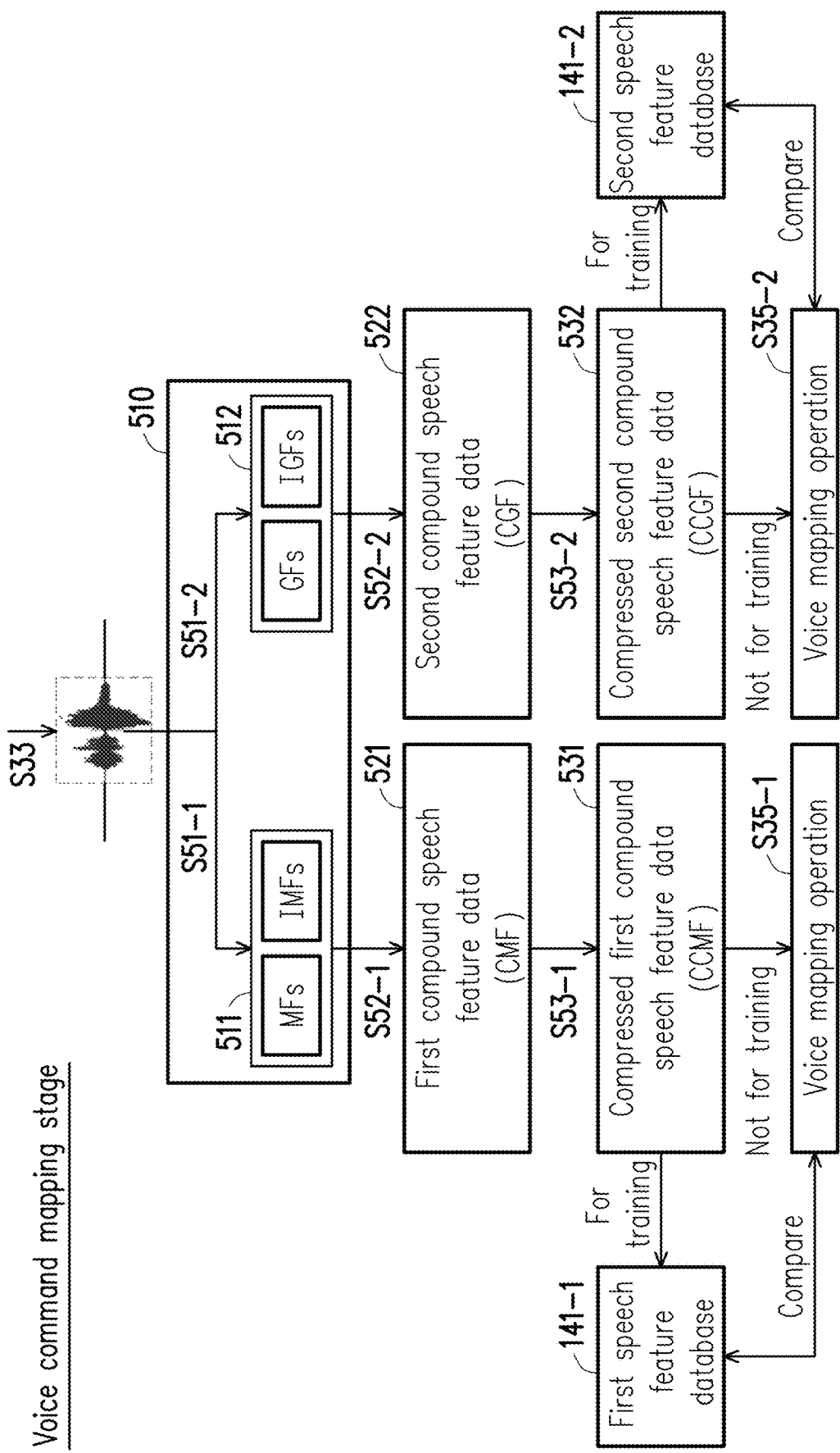
FIGS. 5A to 5B are flowcharts illustrating a voice command mapping stage of a voice command identification method according to an embodiment of the invention.
Figure 5B:
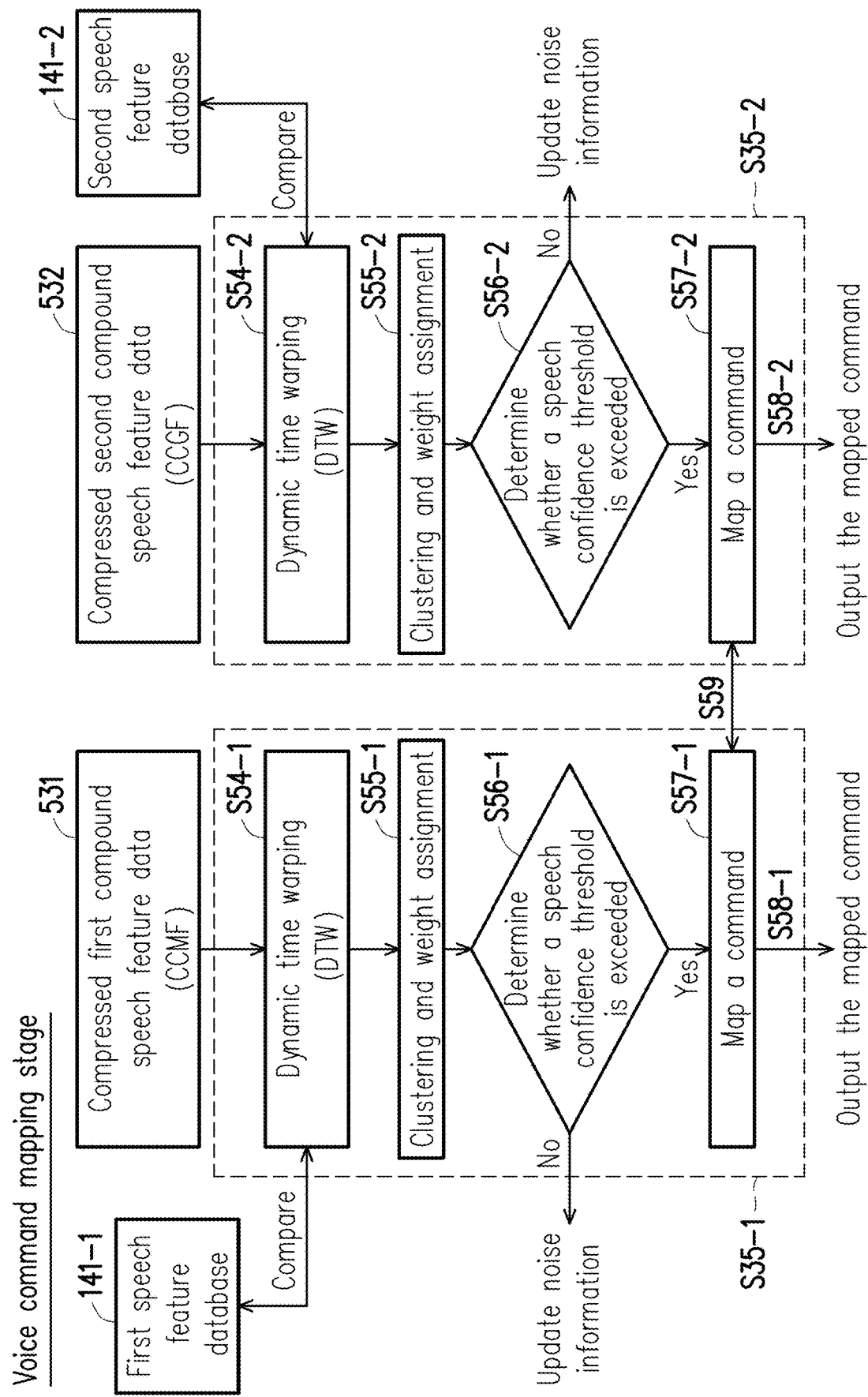

FIGS. 5A to 5B are schematic views illustrating a flow of a voice command mapping stage of a voice command identification method according to an embodiment of the invention.

Referring to FIGS. 3A and 5A, in step S34, the voice command mapping circuit 123 calculates the compound speech feature data corresponding to the target voice signal based on the target voice signal through a compound speech recognition model. Specifically, the compound speech recognition model 510 includes a first compound speech recognition model 511 and a second compound speech recognition model 512.

The first compound speech recognition model 511 includes a mel-scale frequency (MFs) filter and an inverse mel-scale frequency (IMFs) filter. The MFs filter converts a frequency signal into a Mel scale according to the properties of the hearing system of human ears, so as to simulate the perception of sounds by human ears. The IMFs filter mainly serves to supplement the insufficiency of the original MFs filter in terms of the frequency-intensity structure (the frequency-intensity structure of the IMFs filter is similar to the mirror of the frequency-intensity structure of the MFs filter). The first compound speech recognition model 511 serves to strengthen a vocal print of the speaker.

The second compound speech recognition model 512 includes a gammatone-scale frequency (GFs) filter and an Inverse gammatone-scale frequency (IGFs) filter). The GFs filter may preserve the key template feature in a speech, and blur the noise therein. In other words, the GFs filter allows the speech feature data to exhibit higher noise resistance. The IGFs filter mainly serves to supplement the insufficiency of the original GFs filter in terms of the frequency-intensity structure (the frequency-intensity structure of the IGFs filter is similar to the mirror of the frequency-intensity structure of the GFs filter). The second compound speech recognition model 512 serves to strengthen the speech feature.

Thus, by utilizing the above filters at the same time, the compound speech recognition model is able to keep the vocal print feature of the target voice signal and increase the noise resistance of the target voice signal.

Referring to FIG. 5A, in this embodiment, the voice command mapping circuit 123 inputs the target voice signal to the first compound speech recognition model 511 of the compound speech recognition model (Step S51-1), so as to obtain a first compound speech feature data 521 (e.g., a compound mel feature (CMF)) (Step S52-1), and inputs the target voice signal to the second compound speech recognition model 512 of the compound speech recognition model (Step S51-2), so as to obtain a second compound speech feature data 522 (e.g., a compound gammatone feature (CGF)) (Step S52-2).

The voice command mapping circuit 123 may execute a feature compressing operation (Steps S53-1, S53-2) on the first compound speech feature data and the second compound speech feature data, so as to obtain a compressed first compound speech feature data 531 (e.g., a compressed compound mel feature (CCMF)) and a compressed second compound speech feature data 532 (e.g., a compressed compound gammatone feature (CCGF)). The compressed first compound speech feature data and the compressed second compound speech feature data are the compound speech feature data. The data volume of the compound speech feature data obtained through the feature compressing operation is far less than the data volume of the first compound speech feature data and the second compound speech feature data. Therefore, the computational load for the speech mapping operation on the compound speech feature data is also significantly reduced. As a result, the time for computation is shortened.

In the embodiment, the processor 130 may receive the input operation of the user to start a training mode of the electronic device 10. In the training mode, the user may designate the target command of the electronic device to be trained and utter a corresponding voice, so that the voice command management circuit unit 120 may, after obtaining the compound speech feature data of the target voice signal corresponding to the voice, determine the compound speech feature data as a training compound speech feature data corresponding to the target command, and store the compound speech feature data to the corresponding speech feature database to serve as the reference speech feature data.

In other words, in response to the electronic device 10 being in the training mode corresponding to the target command, the voice command mapping circuit 123 stores the compressed first compound speech feature data and the compressed second compound speech feature data in the speech feature database (e.g., respectively storing the compressed first compound speech feature data and the compressed second compound speech feature data in a first speech feature database 141-1 and a second speech feature database 141-2) to serve as the reference speech data. In addition, the compressed first compound speech feature data and the compressed second compound speech feature data that are stored are mapped to the target command.

Comparatively, in response to the electronic device 10 being not in the training mode, the voice command mapping circuit 123 may respectively perform voice mapping operations S35-1 and S35-2 on the compressed first compound speech feature data and the compressed second compound speech feature data, so as to determine the target command mapped to the target voice signal according to the reference speech feature data stored in the first speech feature database 141-1 and the second speech feature database 141-2. It should be noted that the disclosure does not intend to limit how the compound speech feature data is compressed.

Referring to FIG. 3A, after the compound speech feature data is obtained, in step S35, the voice command mapping circuit 123 compares the compound speech feature data with multiple reference speech feature data in the speech feature database 141 via a dynamic time warping (DTW) method, so as to determine the target command mapped to the target voice signal.

Specifically, referring to FIG. 5B, the compressed first compound speech feature data 531 is taken as an example. First of all, the voice command mapping circuit 123 may compare the compound speech feature data with the reference speech feature data in the speech feature database by adopting DTW, so as to identify k final closest reference speech feature data from the reference speech feature data (Step S54-1). It should be noted that, in step S54-1, k closest reference speech feature data are found from the first speech feature database 141-1 according to the temporal sequence via the DTW method and a closest neighbor method. The k closest reference speech feature data found at the last time point are the k final closest reference speech feature data. In addition, each final closest reference speech feature data is mapped to a command. Here, k is a predetermined positive integer.

In the following, details of the DTW method adopted in the embodiment are described with reference to FIGS. 7A and 7B.

FIG. 7A is a schematic view illustrating a matrix for calculating distances among feature data according to an embodiment of the invention. For example, assume the distance between a speech feature data S and a reference speech feature data K1 is currently calculated. In addition, the speech feature data S has three frames, such as S=[$V_{f1}$, $V_{f2}$, $V_{f3}$], each of the $V_f$ is a set of a plurality of feature vectors corresponding to the three frames (e.g., $V^{f1}$ is a set of the feature vectors corresponding to the first frame). The reference speech feature data K1 has four frames, such as K1=[$K1_{F1}$, $K1_{F2}$, $K1_{F3}$, $K1_{F4}$], each of $K1_F$ is a set of four feature vectors of the corresponding to the frames (e.g., $K1_{F1}$ is a set of feature vectors corresponding to the first frame of the reference speech feature data K1).

Referring to FIG. 7A, in order to calculate the distance between the speech feature data S and the reference speech feature data K1, the voice command mapping circuit 123 establishes a distance matrix M1. The dimensions of the distance matrix M1 is determined according to the respective numbers of frames of the speech feature data S and the reference speech feature data K1. In the example, the number of frames of the speech feature data S is 3, and the number of frames of the reference speech feature data K1 is 4. Therefore, the distance matrix M1 is a four-by-three matrix.

Then, the voice command mapping circuit 123 utilizes the following formula to calculate the value of each element in the distance matrix M1. The element may represent the distance between the feature vectors of the corresponding frames in the speech feature data S and the reference speech feature data K1. Here, it is assumed that each frame has 147 feature vectors.

$$M1(i, j) = \left( \sqrt{(V_{fj,1} - K1_{Fi,1})^2 + (V_{fj,2} - K1_{Fi,2})^2 + \ldots + (V_{fj,147} - K_{Fi,147})^2} \right) + \min \begin{cases} M1(i-1, j) \\ M1(i, j-1) \\ M1(i-1, j-1) \end{cases}$$

The value of each element $a_{ij}$ in the distance matrix M1 in FIG. 7A is equal to M1($i,j$). For example, $$a_{11} = M1(1, 1) = \sqrt{(V_{f1,1} - K1_{F1,1})^2 + (V_{f1,2} - K1_{F1,2})^2 + \ldots + (V_{f1,147} - K_{F1,147})^2} \circ$$

The element $a_{11}$ represents the distance between the 147 feature vectors of the first frame of the speech feature data S and the 147 feature vectors of the first frame of the reference speech feature data K1. By analogy, the value of each element in the distance matrix M1 can be calculated. The order for calculating the matrix is from left to right and from top to bottom. In other words, $a_{11}$, $a_{12}$, and $a_{13}$ are calculated first, then $a_{21}$, $a_{22}$, $a_{23}$, then $a_{31}$, $a_{32}$, $a_{33}$, and then $a_{41}$, $a_{42}$, $a_{43}$.

Figure 7B:
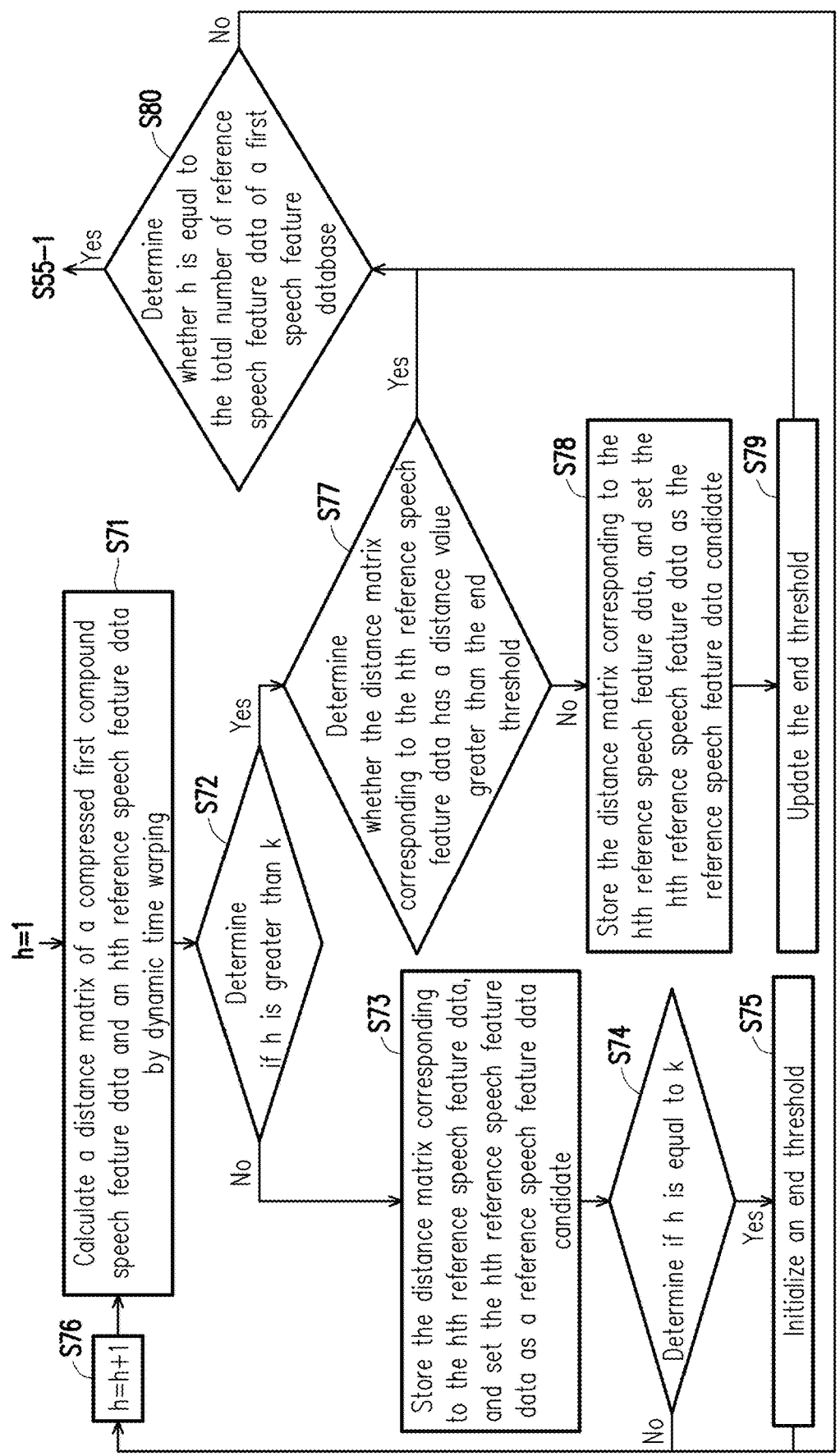
FIG. 7B is a flowchart of comparing reference speech feature data through dynamic time warping according to an embodiment of the invention.

FIG. 7B is a flowchart illustrating comparing reference speech feature data via dynamic time warping according to an embodiment of the invention. Referring to FIG. 7B, steps S71 to S80 in FIG. 7B may be considered as step S54-1 in FIG. 5B. "h" is configured to identify the current reference speech feature data of the first speech feature database 141-1 in comparison with the compressed first compound speech feature data. In addition, the initial value of the "h" is 1, which indicates the "1" (first) reference speech feature data in comparison with the compressed first compound speech feature data. In other words, the "1" (first) reference speech feature data is the reference speech feature data K1, and the reference speech feature data K1 is compared with the compressed first compound speech feature data. Also, a "2" (second) reference speech feature data is the reference speech feature data K2, and so on so forth. Taking the compressed first compound speech feature data as an example, in step S71, the voice command mapping circuit 123 calculates the distance matrix of the compressed first compound speech feature data and the $h^{th}$ reference speech feature data via the DTW. The process for calculating the distance matrix has been described above and therefore will not be repeated in the following. In step S72, the voice command mapping circuit 123 determines whether his greater than k. If h is not greater than k (Step S72→No), the flow proceeds to step S73, and the voice command mapping circuit 123 stores the distance matrix corresponding to the $h^{th}$ reference speech feature data, and sets the $h^{th}$ reference speech feature data as a reference speech feature data candidate. Then, in step S74, the voice command mapping circuit 123 determines whether h is equal to k. If h is not equal to k (step S74→No), the flow proceeds to step S76, and h=h+1. That is, the voice command mapping circuit 123 adds 1 to h, and chooses the next reference speech feature data. Then, the flow returns to step S71.

If it is determined that h is equal to k (step S74→Yes) in step S74, the flow proceeds to step S75. At this time, the voice command mapping circuit 123 may learn that the total number of the currently set reference speech feature data candidates is equal to predetermined k set. In step S75, the voice command mapping circuit 123 initializes an end threshold. Specifically, the voice command mapping circuit 123 looks for a maximum (the maximum distance value) from the elements (distances) of the distance matrix corresponding to the k reference speech feature data candidates, and sets the value of the end threshold as the maximum distance value that is found. Then, step S76 is performed, and 1 is again added to the value of h.

In step S72, if the voice command mapping circuit 123 determines that h is greater than k, the flow proceeds to step S77. The voice command mapping circuit 123 determines whether the distance matrix corresponding to the $h^{th}$ reference speech feature data has a distance value greater than the end threshold. Specifically, the voice command mapping circuit 123 may compare each element (distance value) in the distance matrix of the $h^{th}$ reference speech feature data with the end threshold. If the $h^{th}$ reference speech feature data has no distance value greater than the end threshold (step S77→No), the flow proceeds to step S78, and if the $h^{th}$ reference speech feature data has a distance value greater than the end threshold (step S77→Yes), the flow proceeds to step S80.

In an embodiment, after h exceeds k, in the process of executing step S77, namely in the process of calculating the distance matrix of the $h^{th}$ reference speech feature data, the voice command mapping circuit 123 may compare each element (distance value) of the distance matrix with the end threshold. When the distance values in one column of the distance matrix are all greater than the end threshold, the calculation with respect to other distance values in the distance matrix is stopped, and the flow proceeds to step S80. In this way, the computing speed of looking for the k final closest reference speech feature data can be facilitated.

In step S78, the voice command mapping circuit 123 stores the distance matrix corresponding to the $h^{th}$ reference speech feature data, and sets the $h^{th}$ reference speech feature data as the reference speech feature data candidate. Specifically, the voice command mapping circuit 123 sets the $h^{th}$ reference speech feature data as the reference speech feature data candidate (the total number of the reference speech feature data candidates is k+1) and delete the reference speech feature data candidates having the end threshold from the reference speech feature data candidates, so as to keep k reference speech feature data candidates.

Then, in step S79, the voice command mapping circuit 123 updates the end threshold. In other words, the voice command mapping circuit 123 may look for the maximum distance value from the distance values of the distance matrices of the current k reference speech feature data candidates, and sets the maximum distance value as the new end threshold.

Then, in step S80, the voice command mapping circuit 123 determines whether h is equal to the total number of the reference speech feature data of the first speech feature database. If h is equal to the total number of the reference speech feature data of the first speech feature database (step S80→Yes), the voice command mapping circuit 123 may determine that all the reference speech feature data of the first speech feature database have been calculated with the compressed first compound speech feature data by adopting the DTW to derive the corresponding distance matrix, and the currently configured k reference speech feature data candidates are the k final closest reference speech feature data. Then, the voice command mapping circuit 123 executes step S55-1. If h is not equal to the total number of the reference speech feature data of the first speech feature database (step S80→No), the flow proceeds to step S76. Accordingly, through the process shown in FIG. 7B, the voice command mapping circuit 123 can find the k final closest reference speech feature data.

Referring to FIG. 5B, after finding the k final closest reference speech feature data, the voice command mapping circuit 123 may perform clustering and weight assignment on the k final closest reference speech feature data (step S55-1). Details in this regard will be described in the following with reference to FIG. 6. It should be noted that the voice mapping operation S35-2 of the compressed second compound speech feature data 532 is similar to the voice mapping operation S35-1 of the compressed first compound speech feature data 531, steps S54-2, S55-2, S56-2, S57-2, and S58-2 included in the voice mapping operation S35-2 are respectively similar to steps S54-1, S55-1 S56-1, S57-1, S58-1 of the voice mapping operation S35-1, so the details of the voice mapping operation S35-2 will not be repeated herein.

Figure 6:
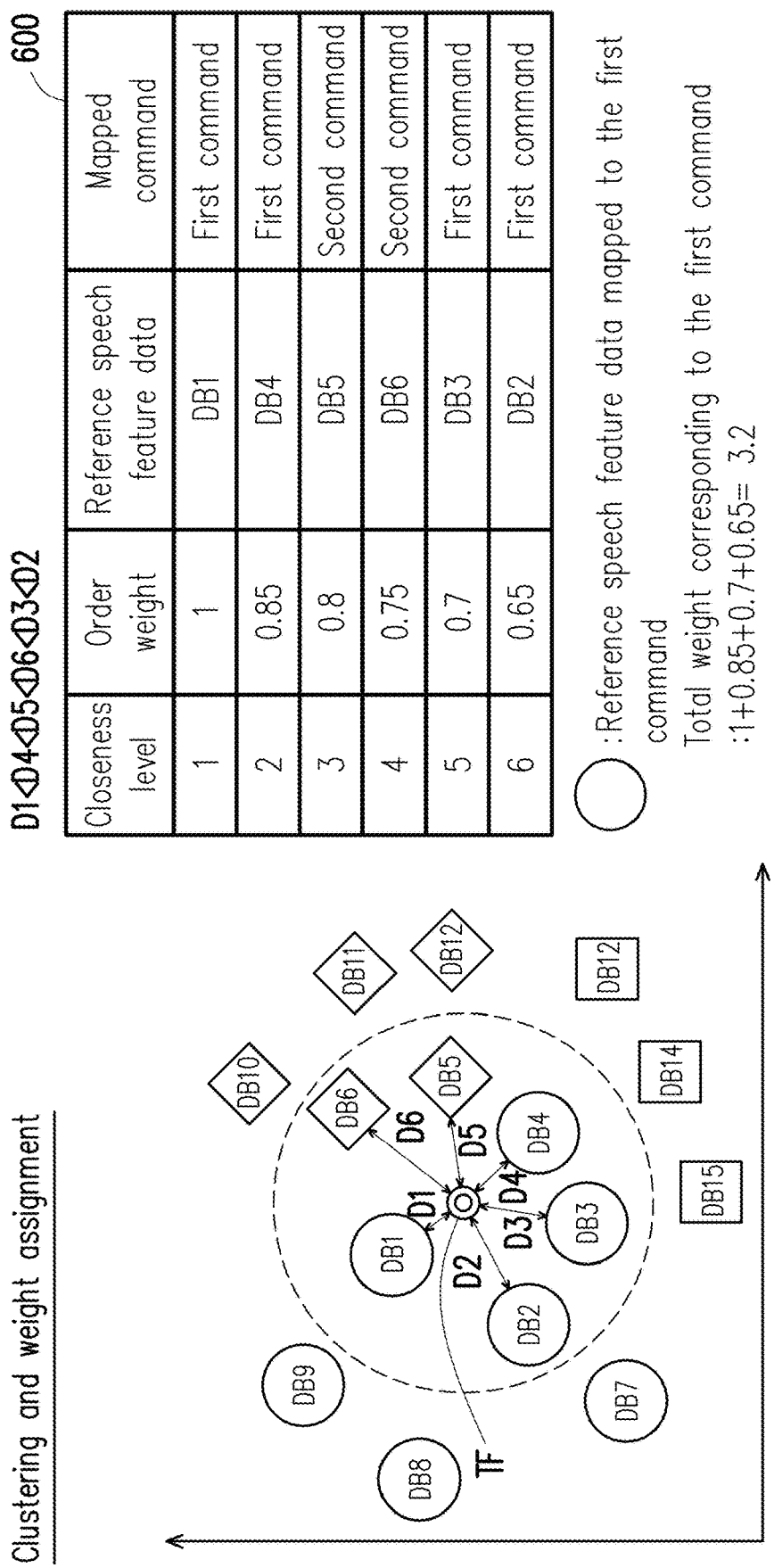
FIG. 6 is a schematic view illustrating clustering and weight assignment according to an embodiment of the invention.

FIG. 6 is a schematic view illustrating clustering and weight assignment according to an embodiment of the invention. For example, in the example shown in FIG. 6, it is assumed that the compressed first compound speech feature data is a target feature value TF, k is set to 6, the k final closest reference speech feature data among a plurality of reference speech feature data DB1 to DB15 are the reference speech feature data DB1 to DB6, and the final closest reference speech data DB1 to DB4 are mapped to a first command of a plurality of commands of the electronic device 10, while the final closest reference speech feature data DB5 to DB6 are mapped to a second command. In addition, a confidence threshold is set to 3.

The voice command mapping circuit 123 may calculate k distances D1 to D6 respectively between the compound speech feature data and the k final closest speech feature data DB1 to DB6, and assign an order weight to each of the k final closest reference speech feature data according to the magnitudes of the k distances D1 to D6, where a smaller distance corresponds to a greater order weight. As shown in a table 600, the voice command mapping circuit 123 may identify corresponding closeness levels, from near to distant, according to the distances D1 to D6, order the k final closest reference speech feature data DB1 to DB6 according to the corresponding closeness levels, and assign the corresponding order weights according to the closeness levels (i.e., a closeness order more towards the front, the greater the corresponding order weight). For example, according to the closeness level "1, 2, 3, 4, 5, 6", the order weights of the final closest reference speech feature data are respectively set as "1, 0.85, 0.8, 0.75, 0.7, 0.65" according to the sequence.

Then, the voice command mapping circuit 123 respectively performs a weight summing operation on the one or more commands mapped to the k final closest reference speech feature data according to the order weights of the k final closest reference speech feature data, so as to obtain a total weight of each of the one or more commands. For example, in an embodiment, the sequence weights respectively assigned to the k final closest reference speech feature data DB1 to DB6 according to the distances are respectively 1, 0.65, 0.7, 0.85, 0.8, 0.75. Then, the total weight corresponding to the first command is the total of the order weights, i.e., 1, 0.65, 0.7, and 0.85, of the final closest reference speech feature data DB1 to DB4 mapped to the first command (i.e., 3.2), and the total weight corresponding to the second command is the total of the order weights, i.e., 0.8 and 0.75, of the final closest reference speech feature data DB5 to DB6 mapped to the second command (i.e., 1.55).

After calculating the total weights, the voice command mapping circuit 123 determines whether the one or more commands include the target command mapped to the target voice signal according to the maximum total weight in the one or more total weights and the confidence threshold (step S56-1). In addition, in response to the maximum total weight being greater than the confidence threshold, the voice command mapping circuit 123 determines that the command corresponding to the maximum total weight in the one or more commands is the target command mapped to the target voice signal, and in response to the maximum total weight being not greater than the confidence threshold, the voice command mapping circuit 123 determines that the target voice signal is noise. The target voice signal determined as noise may also be used to update the noise information.

For instance, in this example, the maximum total weight is the total weight corresponding to the first command, and the total weight corresponding to the first command is greater than the confidence threshold (i.e., 3.2>3). Therefore, the voice command mapping circuit 123 determines that the total weight corresponding to the first command is reliable, and the first command is the target command mapped to the target voice signal (step S57-1). The voice command mapping circuit 123 may output the target command mapped to the target voice signal to the processor 130 (step S58-1). It should be noted that when the target commands determined in steps 57-1 and 57-2 are different, in step S59, the voice command mapping circuit 123 may further add up the total weights of the same commands in step S55-1 and S55-2, so as to obtain the combined total weights of the commands and determine the command with the maximum total weight as the target command.

Then, returning to FIG. 3A, after determining the target command mapped to the target voice signal, the voice command mapping circuit 123 may notify the processor 130, and the processor 130 may execute the target command at step S36. Detailed command descriptions of the target command have been provided in the firmware of the electronic device 10, and the processor 130 may execute the target command according to the command descriptions of the target command. The invention does not intend to limit the detailed command descriptions of the target command.

It should be noted that the voice identification operation is not executed by another electronic device through the Internet connection or other connections. In other words, the voice identification operation is independently executed by the voice command management circuit unit 120 in the electronic device 10. Since there is no connection to other external devices, the security of the user's private information is ensured.

It should also be noted that, in the exemplary embodiment, the voice command management circuit unit 120 is implemented as a hardware circuit. However, the disclosure is not limited thereto. Program codes or software may serve to realize the voice command management circuit unit 120 and exert the functions equivalent to the voice command management circuit unit 120, and the program codes or software may be stored in the storage unit 140. For example, the functions of the voice command management circuit unit 120 may also be realized by a voice command management module formed by a plurality of program commands, and the voice command management module may include a voice trigger module, a voice purify module, and a voice command mapping module. In addition, the voice command management module may be executed by the processor 130 to achieve the functions of the voice command management circuit unit 120. In other words, the method according to the embodiments of the invention may be realized as software or firmware, or may be realized as software or computer codes stored in a recording medium (e.g., CD-ROM, RAM, soft drive, hard drive, or a magneto-optical disc). Besides, when the processor 130 accesses the program code module to realize the voice identification method, the electronic device 10 is also turned into a specialized electronic device with a designated function capable of handling the voice identification operation.

In view of the foregoing, the electronic device and the voice identification method adapted for the electronic device according to the embodiments of the invention are capable of independently determining the presence of the voice command by consuming less computing resources under the condition of not requiring Internet connection to trigger the subsequent voice purify operation, making the voice command (the voice corresponding to the target command) clearer by the voice purify operation, and more accurately determining that the voice command uttered by the user is mapped to the target command of the electronic device by adopting the compound speech recognition model and the dynamic time warping. In this way, the electronic device can be efficiently controlled with the user's voice. In addition, since the voice command mapping operation can be performed without the connection to the Internet, the embodiments of the invention are further able to prevent the private information of the user from being leaked through the Internet, so the security of the user's private information is ensured. In addition, the embodiments of the invention are adapted for special electronic devices that require confidentiality of private information (e.g., personal assisting tools, medical devices, etc.).

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electronic device, comprising:
    a microphone matrix, wherein a plurality of sound signals are obtained from the microphone matrix;
    a voice command management circuit unit, coupled to the microphone matrix;
    a storage unit, configured to store a speech feature database and coupled to the voice command management circuit unit; and
    a processor, coupled to the voice command management circuit unit,
    wherein the voice command management circuit unit executes a voice purify operation on the sound signals to obtain a purified sound signal and identifies a target voice signal from the purified sound signal,
    wherein the voice command management circuit unit calculates a compound speech feature data corresponding to the target voice signal through a compound speech recognition model, wherein in the operation in which the voice command management circuit unit calculates the compound speech feature data corresponding to the target voice signal through the compound speech recognition model,
        the voice command management circuit unit inputs the target voice signal to a first compound speech recognition model in the compound speech recognition model to obtain a first compound speech feature data, and inputs the target voice signal to a second compound speech recognition model in the compound speech recognition model to obtain a second compound speech feature data,
        the voice command management circuit unit executes a feature compressing operation on the first compound speech feature data and the second compound speech feature data to obtain a compressed first compound speech feature data and a compressed second compound speech feature data, wherein the compressed first compound speech feature data and the compressed second compound speech feature data are the compound speech feature data,
        wherein the voice command management circuit unit respectively executes a voice mapping operation on the compressed first compound speech feature data and the compressed second compound speech feature data, so as to determine a target command mapped to the target voice signal,
    wherein the voice command management circuit unit compares the compound speech feature data with a plurality of reference speech feature data in the speech feature database, so as to determine the target command mapped to the target voice signal, and each of the reference speech feature data is mapped to one of a plurality of commands of the electronic device, and
    wherein the processor executes the target command.

2. The electronic device as claimed in claim 1, wherein the voice command management circuit unit is further configured to identify a first trigger voice signal from a first sound signal of the plurality of sound signals,
    wherein the voice command management circuit unit identifies a portion of the first sound signal with sound intensity that is greater than a trigger sound intensity threshold in the first sound signal according to a sound intensity of the first sound signal, and
    wherein the voice command management circuit unit determines whether a lasting time of the portion of the first sound signal is less than a trigger time threshold,
    wherein, in response to the lasting time of the portion of the first sound signal being less than the trigger time threshold, the portion of the first sound signal is determined as the first trigger voice signal, and
    wherein, in response to the lasting time of the portion of the first sound signal being not less than the trigger time threshold, the portion of the first sound signal is determined as noise.

3. The electronic device as claimed in claim 2, wherein the voice command management circuit unit updates noise information according to the portion of the first sound signal determined as noise, and the noise information is applied in a noise suppressing operation in the voice purify operation.

4. The electronic device as claimed in claim 2, wherein in the operation in which the voice command management circuit unit is further configured to execute the voice purify operation on the plurality of sound signals to obtain the purified sound signal and identify the target voice signal from the purified sound signal,
    the voice command management circuit unit calculates a plurality of time differences corresponding to the plurality of sound signals according to the first trigger voice signal, so as to obtain a sound source angle corresponding to the first trigger voice signal,
    wherein the voice command management circuit unit executes a sound bunching operation on the plurality of sound signals according to the sound source angle, so as to generate a bunched sound signal, wherein the bunched sound signal is the purified sound signal, and
    wherein the voice command management circuit unit executes a noise suppressing operation on the bunched sound signal, so as to obtain the target voice signal.

5. The electronic device as claimed in claim 4, wherein the first sound signal is generated by a first microphone of a plurality of microphones of the microphone matrix according to a received sound, and a plurality of second microphones other than the first microphone in the microphones generate a plurality of second sound signals according to the received sound,
    wherein the voice command management circuit unit identifies a plurality of initial times of the first trigger voice signal and the plurality of second sound signals and calculates a plurality of time differences,
    the voice command management circuit unit calculates a plurality of time difference moving averages corresponding to the time differences according to the time differences,
    the voice command management circuit unit chooses a plurality of target time difference moving averages that are negative from the plurality of time difference moving averages, and
    the sound source angle is calculated according to the plurality of target time difference moving averages and a plurality of corresponding angles corresponding to the target time difference moving averages.

6. The electronic device as claimed in claim 4, wherein in the sound bunching operation,
    the voice command management circuit unit identifies a bunched portion and a non-bunched portion corresponding to the sound source angle in each of the plurality of sound signals according to the sound source angle, and the voice command management circuit unit enhances a sound intensity of the bunched portion of each of the plurality of sound signals, reduces a sound intensity of the non-bunched portion of each of the plurality of sound signals, and adds up the bunched portions of the sound signals according to the sound source angle and the plurality of time differences corresponding to the microphones, so as to obtain the bunched sound signal.

7. The electronic device as claimed in claim 4, wherein in the noise suppressing operation,
the voice command management circuit unit reduces a sound intensity of noise in the bunched sound signal according to noise information through a Wiener filter by adopting a two-step noise reduction method and a harmonic regeneration noise reduction method, so as to obtain the target voice signal, wherein a sound intensity of the target voice signal is greater than a target sound intensity threshold.

8. The electronic device as claimed in claim 1, wherein in the operation in which the voice command management circuit unit calculates the compound speech feature data corresponding to the target voice signal through the compound speech recognition model,
wherein in response to determining that the electronic device is in a training mode corresponding to the target command, the voice command management circuit unit stores the compressed first compound speech feature data and the compressed second compound speech feature data in the speech feature database to serve as a reference speech feature data, and the compressed first compound speech feature data and the compressed second compound speech feature data that are stored are mapped to the target command.

9. The electronic device as claimed in claim 8, wherein the first compound speech recognition model comprises a mel-scale frequency (MFs) filter and an inverse mel-cale frequency (IMFs) filter, and the second compound speech recognition model comprises a gammatone-scale frequency (GFs) filter and an inverse gammatone-scale frequency (IGFs) filter.

10. The electronic device as claimed in claim 1, wherein in the operation in which the voice command management circuit unit compares the compound speech feature data with the reference speech feature data in the speech feature database, so as to determine the target command mapped to the target voice signal,
the voice command management circuit unit compares the compound speech feature data with the plurality of reference speech feature data in the speech feature database by dynamic time warping method, so as to identify k final closest reference speech feature data from the plurality of reference speech feature data,
the voice command management circuit unit calculates respective distances between the compound speech feature data and the k final closest reference speech feature data,
the voice command management circuit unit respectively assigns an order weight to each of the k final closest reference speech feature data according to magnitudes of the distances, wherein a smaller distance corresponds to a greater order weight,
the voice command management circuit unit respectively performs a weight summing operation for one or more commands mapped to the k final closest reference speech feature data according to the order weights of the k final closest reference speech feature data, so as to obtain a total weight corresponding to each of the one or more commands, and
the speech command management circuit unit compares a maximum total weight of the one or more total weights with a confidence threshold,
wherein, in response to the maximum total weight being greater than the confidence threshold, the voice command management circuit unit determines a command corresponding to the maximum total weight among the one or a plurality of commands as the target command mapped to the target voice signal, and
wherein, in response to the maximum total weight being not greater than the confidence threshold, the voice command management circuit unit determines the target voice signal as noise.

11. A voice command identification method, adapted to an electronic device having a microphone matrix, the voice command identification method comprising:
obtaining a plurality of sound signals from the microphone matrix;
executing a voice purify operation on the plurality of sound signals to obtain a purified sound signal and identifying a target voice signal from the purified sound signal;
calculating a compound speech feature data corresponding to the target voice signal through a compound speech recognition model, wherein the step of calculating the compound speech feature data corresponding to the target voice signal through the compound speech recognition model comprises:
inputting the target voice signal to a first compound speech recognition model in the compound speech recognition model to obtain a first compound speech feature data, and inputting the target voice signal to a second compound speech recognition model in the compound speech recognition model to obtain a second compound speech feature data;
executing a feature compressing operation on the first compound speech feature data and the second compound speech feature data to obtain a compressed first compound speech feature data and a compressed second compound speech feature data, wherein the compressed first compound speech feature data and the compressed second compound speech feature data are the compound speech feature data;
respectively executing a voice mapping operation on the compressed first compound speech feature data and the compressed second compound speech feature data, so as to determine a target command mapped to the target voice signal;
comparing the compound speech feature data with a plurality of reference speech feature data in a speech feature database, so as to determine the target command mapped to the target voice signal; and
executing the target command.

12. The voice command identification method as claimed in claim 11, further comprising:
identifying a first trigger voice signal from a first sound signal of the plurality of sound signals;
identifying a portion of the first sound signal with sound intensity that is greater than a trigger sound intensity threshold in the first sound signal according to a sound intensity of the first sound signal; and
determining whether a lasting time of the portion of the first sound signal is less than a trigger time threshold, wherein, in response to the lasting time of the portion of the first sound signal being less than the trigger time threshold, the portion of the first sound signal is determined as the first trigger voice signal, and wherein, in response to the lasting time of the portion of the first sound signal being not less than the trigger time threshold, the portion of the first sound signal is determined as noise.

13. The voice command identification method as claimed in claim 12, further comprising:

updating noise information according to the portion of the first sound signal determined as noise, wherein the noise information is applied in a noise suppressing operation in the voice purify operation.

14. The voice command identification method as claimed in claim 12, wherein executing the voice purify operation on the plurality of sound signals to obtain the purified sound signal and identifying the target voice signal from the purified sound signal comprises:

calculating a plurality of time differences corresponding to the plurality of sound signals according to the first trigger voice signal, so as to obtain a sound source angle corresponding to the first trigger voice signal;

executing a sound bunching operation on the plurality of sound signals according to the sound source angle, so as to generate a bunched sound signal, wherein the bunched sound signal is the purified sound signal; and executing a noise suppressing operation on the bunched sound signal, so as to obtain the target voice signal.

15. The voice command identification method as claimed in claim 14, wherein the first sound signal is generated by a first microphone of a plurality of microphones of the microphone matrix according to a received sound, and a plurality of second microphones other than the first microphone in the microphones generate a plurality of second sound signals according to the received sound, and the voice command identification method further comprises:

identifying a plurality of initial times of the first trigger voice signal and the plurality of second sound signals and calculating a plurality of time differences;

calculating a plurality of time difference moving averages corresponding to the plurality of time differences according to the plurality of time differences;

choosing a plurality of target time difference moving averages that are negative from the plurality of time difference moving averages, and calculating the sound source angle according to the plurality of target time difference moving averages and a plurality of corresponding angles corresponding to the plurality of target time difference moving averages.

16. The voice command identification method as claimed in claim 14, wherein the beam bunching operation comprises:

identifying a bunched portion and a non-bunched portion corresponding to the sound source angle in each of the plurality of sound signals according to the sound source angle; and enhancing a sound intensity of the bunched portion in each of the plurality of sound signals, reducing a sound intensity of the non-bunched portion of each of the plurality of sound signals, and adding up the bunched portions of the plurality of sound signals according to the sound source angle and the plurality of time differences corresponding to the plurality of microphones, so as to obtain the bunched sound signal.

17. The voice command identification method as claimed in claim 14, wherein the noise suppressing operation comprises:

reducing a sound intensity of noise in the bunched sound signal according to noise information through a Wiener filter by utilizing a two-step noise reduction method and a harmonic regeneration noise reduction method, so as to obtain the target voice signal, wherein a sound intensity of the target voice signal is greater than a target sound intensity threshold.

18. The voice command identification method as claimed in claim 11, wherein the step of calculating the compound speech feature data corresponding to the target voice signal through the compound speech recognition model comprises:

in response to determining that the electronic device is in a training mode corresponding to the target command, storing the compressed first compound speech feature data and the compressed second compound speech feature data in the speech feature database to serve as a reference speech feature data, wherein the compressed first compound speech feature data and the compressed second compound speech feature data that are stored are mapped to the target command.

19. The voice command identification method as claimed in claim 18, wherein the first compound speech recognition model comprises a mel-scale frequency (MFs) filter and an inverse mel-cale frequency (IMFs) filter, and the second compound speech recognition model comprises a gammatone-scale frequency (GFs) filter and an inverse gammatone-scale frequency (IGFs) filter.

20. The voice command identification method as claimed in claim 11, wherein comparing the compound speech feature data with the reference speech feature data in the speech feature database, so as to determine the target command mapped to the target voice signal, comprises:

comparing the compound speech feature data with the plurality of reference speech feature data in the speech feature database by dynamic time warping method, so as to identify k final closest reference speech feature data from the plurality of reference speech feature data;

calculating respective distances between the compound speech feature data and the k final closest reference speech feature data;

respectively assigning an order weight to each of the k final closest reference speech feature data according to magnitudes of the distances, wherein a smaller distance corresponds to a greater order weight;

respectively performing a weight summing operation for one or a plurality of commands mapped to the k final closest reference speech feature data according to the order weights of the k final closest reference speech feature data, so as to obtain a total weight corresponding to each of the one or the plurality of commands; and comparing a maximum total weight of the one or the plurality of total weights with a confidence threshold, wherein, in response to the maximum total weight being greater than the confidence threshold, a command corresponding to the maximum total weight among the one or the plurality of commands is determined as the target command mapped to the target voice signal, and wherein, in response to the maximum total weight being not greater than the confidence threshold, the target voice signal is determined as noise.

* * * * *